US012358306B2

(12) United States Patent
Arita et al.

(10) Patent No.: US 12,358,306 B2
(45) Date of Patent: Jul. 15, 2025

(54) PRINTING APPARATUS AND CONTROL METHOD

(71) Applicant: CANON KABUSHIKI KAISHA, Tokyo (JP)

(72) Inventors: Keisuke Arita, Kanagawa (JP); Masashi Ito, Tokyo (JP); Kento Tamari, Saitama (JP); Motoyuki Taguchi, Tokyo (JP); Sho Takahashi, Kanagawa (JP); Ryota Komatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 18/119,905

(22) Filed: Mar. 10, 2023

(65) Prior Publication Data

US 2023/0312301 A1 Oct. 5, 2023

(30) Foreign Application Priority Data

Mar. 17, 2022 (JP) ................................ 2022-042781

(51) Int. Cl.
*B41J 11/00* (2006.01)
*B41J 3/60* (2006.01)
(Continued)

(52) U.S. Cl.
CPC ............... *B41J 11/006* (2013.01); *B41J 3/60* (2013.01); *B41J 13/0009* (2013.01);
(Continued)

(58) Field of Classification Search
CPC . B65H 5/062; B65H 5/24; B65H 5/34; B65H 29/58; B65H 29/60; B65H 29/66;
(Continued)

(56) References Cited

U.S. PATENT DOCUMENTS

2001/0033050 A1* 10/2001 Kinoshita ............ B41J 13/0027
271/3.17
2003/0118385 A1* 6/2003 Isemura ............. G03G 15/6561
399/388

(Continued)

FOREIGN PATENT DOCUMENTS

JP H06-056299 A 3/1994
JP 2003-237981 A 8/2003

OTHER PUBLICATIONS

European Search Report dated Jul. 28, 2023, in related European Patent Application No. 23159406.0.

*Primary Examiner* — Prasad V Gokhale
(74) *Attorney, Agent, or Firm* — VENABLE LLP

(57) ABSTRACT

A printing apparatus includes a control unit that reduces an overlap amount of a preceding print medium and a succeeding print medium, from an overlap state in which the succeeding print medium overlaps a trailing edge of the preceding print medium and alternately performs an operation of conveying a print medium by a first conveyance unit and a printing operation of ejecting ink on the print medium while moving a carriage in a state in which the print medium stops. The reduction control conveys the preceding print medium conveyed by the second conveyance unit faster than the succeeding print medium conveyed by the first conveyance unit, in a state in which the printing control for the succeeding print medium is executed.

20 Claims, 22 Drawing Sheets

(51) Int. Cl.

| | |
|---|---|
| ***B41J 13/00*** | (2006.01) |
| ***B65H 5/06*** | (2006.01) |
| ***B65H 43/00*** | (2006.01) |
| ***B65H 85/00*** | (2006.01) |
| *B65H 29/60* | (2006.01) |

(52) U.S. Cl.

CPC ......... *B41J 13/0045* (2013.01); *B41J 13/009* (2013.01); *B65H 5/062* (2013.01); *B65H 43/00* (2013.01); *B65H 85/00* (2013.01); *B65H 29/60* (2013.01); *B65H 2301/444* (2013.01); *B65H 2511/20* (2013.01); *B65H 2511/22* (2013.01); *B65H 2513/10* (2013.01); *B65H 2513/50* (2013.01); *B65H 2513/51* (2013.01)

(58) Field of Classification Search

CPC ........... B65H 29/6609; B65H 29/6618; B65H 29/6627; B65H 29/669; B65H 85/00; B65H 2511/13; B65H 2511/20; B65H 2511/22; B65H 2511/524; B65H 2513/10; B65H 2513/50; B65H 2513/51; B41J 3/60; B41J 11/006; B41J 13/0009; B41J 13/0045; B41J 13/009

See application file for complete search history.

(56) References Cited

U.S. PATENT DOCUMENTS

2004/0119224 A1 6/2004 Otsuka
2015/0103112 A1* 4/2015 Lo .............................. B41J 3/60 347/16
2019/0330004 A1 10/2019 Ogawa
2023/0294426 A1* 9/2023 Sugiyama .............. B41J 13/009 347/16

* cited by examiner

FIG. 3A

| PRINTING ORDER N | PAGE NUMBER K | SHEET M | PRINTING SURFACE F | FEED SOURCE Q | PROCESSING G AFTER PRINTING |
|---|---|---|---|---|---|
| 1 | 2 | SH1 | REVERSE | FEED TRAY | INVERSION |
| 2 | 4 | SH2 | REVERSE | FEED TRAY | INVERSION |
| 3 | 1 | SH1 | OBVERSE | SUB-CONVEYANCE ROUTE | DISCHARGE |
| 4 | 3 | SH2 | OBVERSE | SUB-CONVEYANCE ROUTE | DISCHARGE |

FIG. 3B

| PRINTING ORDER N | PAGE NUMBER K | SHEET M | PRINTING SURFACE F | FEED SOURCE Q | PROCESSING G AFTER PRINTING |
|---|---|---|---|---|---|
| 1 | 1 | SH1 | OBVERSE | FEED TRAY | DISCHARGE |
| 2 | 2 | SH2 | OBVERSE | FEED TRAY | DISCHARGE |
| 3 | 3 | SH3 | OBVERSE | FEED TRAY | DISCHARGE |

PRINTING APPARATUS AND CONTROL METHOD

BACKGROUND OF THE INVENTION

Field of the Invention

The present invention relates to a printing apparatus.

Description of the Related Art

A printing apparatus in which a preceding print medium and a succeeding print medium are conveyed in an overlap state in which the leading edge portion of the succeeding print medium overlaps the preceding print medium and printing is performed on the succeeding print medium is known. After the overlap portion passes a printhead, it is sometimes desirable to cancel the overlap state or reduce the overlap amount from the viewpoints of the dischargeability of the print medium and making the apparatus jam-proof. Japanese Patent Laid-Open No. 6-56299 discloses a printing apparatus that cancels the overlap state by increasing the conveyance velocity of the preceding print medium.

Unfortunately, in this method of canceling the overlap state by increasing the conveyance velocity of the preceding print medium, it is sometimes necessary to perform conveyance at a very high speed depending on the dimensions of a conveyance route of the print medium. This is disadvantageous in terms of noise and power consumption.

SUMMARY OF THE INVENTION

The present invention provides a technique that reduces the overlap amount of a preceding print medium and a succeeding print medium while the conveyance velocity of the preceding print medium is kept low.

According to an aspect of the present invention, there is provided a printing apparatus comprising: a printing unit configured to print an image on a print medium; a first conveyance unit configured to convey a print medium in a conveyance direction; a second conveyance unit configured to convey a print medium printed by the printing unit, on a downstream side in the conveyance direction of the first conveyance unit; and a control unit configured to perform reduction control of reducing an overlap amount of a preceding print medium and a succeeding print medium, from an overlap state in which the succeeding print medium overlaps a trailing edge of the preceding print medium, wherein the reduction control includes control of conveying the preceding print medium conveyed by the second conveyance unit faster than the succeeding print medium conveyed by the first conveyance unit, in a state in which the first conveyance unit is capable of conveying the succeeding print medium in the conveyance direction.

Further features of the present invention will become apparent from the following description of exemplary embodiments (with reference to the attached drawings).

BRIEF DESCRIPTION OF THE DRAWINGS

FIGS. 3A and 3B are views showing examples of the printing conditions;

DESCRIPTION OF THE EMBODIMENTS

Figure 1:
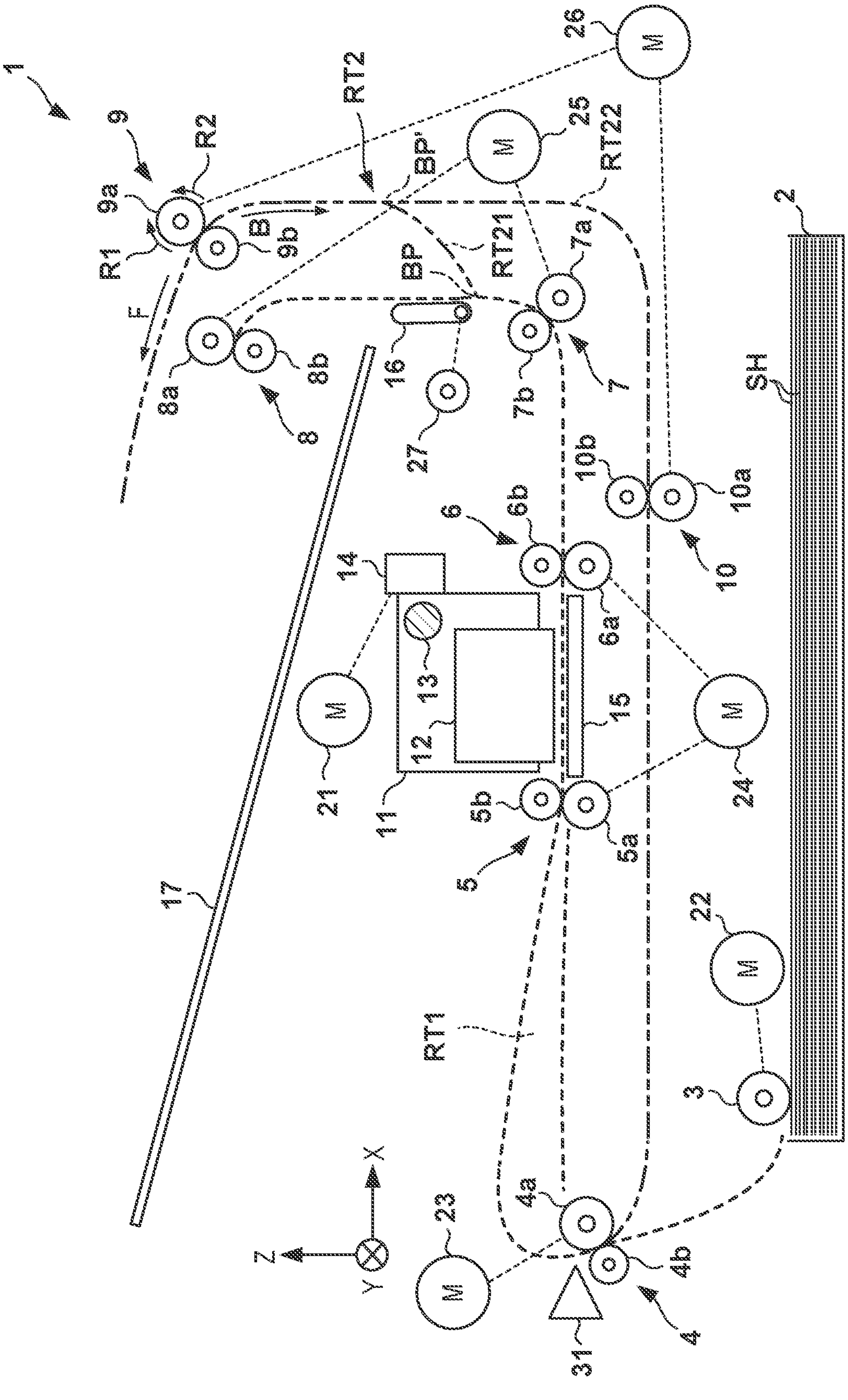
FIG. 1 is a schematic view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Outline of Printing Apparatus>

FIG. 1 is a schematic views of a printing apparatus 1 according to this embodiment. In this embodiment, a case will be described in which the present invention is applied to a serial type inkjet printing apparatus, but the present invention is also applicable to printing apparatuses of other types. In the drawings, an arrow X and an arrow Y indicate horizontal directions orthogonal to each other, and an arrow Z indicates a vertical direction. A downstream side and an upstream side are based on the conveyance direction of a print medium.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, a plastic film, and the like may be used as print media.

A printing apparatus 1 is an apparatus that performs printing on sheets SH as print media stacked in a feed tray (stacker) 2, and discharges the sheets SH to a discharge tray 17. A main conveyance route RT1 for guiding the conveyance of the sheets SH is formed from the feed tray 2 to the discharge tray 17, and the sheets SH in the feed tray 2 are supplied one by one to the main conveyance route RT1 by a pickup roller 3. The pickup roller 3 is rotated by the driving force of a feed motor 22. Note that in the main conveyance route RT1 schematically shown in each drawing, there is only one route between a feed unit 4 and a conveyance unit 5, but upper and lower routes extending along upper and lower conveyance guides are shown.

The printing apparatus 1 also includes a sub-conveyance route RT2 branched by a branch point BP from the main conveyance route RT1. The sub-conveyance route RT2 is a route for inverting the obverse and reverse surfaces of the sheet SH and returning the sheet SH to the main conveyance route RT1, and is used when performing double-sided printing on the sheet SH. Note that the printing apparatus 1 need not have the double-sided printing function for the sheet SH, and the sub-conveyance route RT2 and its relevant arrangement are unnecessary in this case.

The printing apparatus 1 includes the feed unit 4 and a plurality of conveyance units 5 to 10. The feed unit 4 and the plurality of conveyance units 5 to 8 are arranged along the main conveyance route RT1. The feed unit 4, the conveyance unit 5, the conveyance unit 6, the conveyance unit 7, and the conveyance unit 8 are arranged in this order from the upstream side to the downstream side in the conveyance direction of the sheet SH in the main conveyance route RT1. The conveyance units 9 and 10 are arranged along the sub-conveyance route RT2, and are arranged in this order from the upstream side to the downstream side in the conveyance direction of the sheet SH in the sub-conveyance route RT2.

Note that in the following explanation, the upstream side and the downstream side mean the upstream side and the downstream side in the conveyance direction of the sheet SH in the main conveyance route RT1, unless otherwise specified. Note also that the leading edge and trailing edge of the sheet SH mean the downstream edge and upstream edge of the sheet SH.

The feed unit 4 feeds the sheet SH supplied to the main conveyance route RT1 by the pickup roller 3, or the sheet SH returned from the sub-conveyance route RT2 to the main conveyance route RT1, to the conveyance unit 5. The feed unit 4 includes a feed roller 4*a*, and a driven roller 4*b* that is urged against the feed roller 4*a* by a spring or the like (not shown). The feed roller 4*a* is a rotational member that rotates by the driving force of a feed motor 23, and the driven roller 4*b* is a rotational member that rotates following the rotation of the feed roller 4*a*.

The sheet SH is nipped by a nip portion between the driving roller 4*a* and the driven roller 4*b*, and conveyed by the rotations of the driving roller 4*a* and the driven roller 4*b*. Note that the pickup roller 3 is a one-way roller. Therefore, after the sheet SH is conveyed to a position exceeding the nip portion of the feed unit 4, conveyance by the feed unit 4 can be continued even when driving of the pickup roller 3 is stopped.

Note that this embodiment includes the pickup roller 3 and the feed roller 4*a*, but it is also possible to use only the feed roller 4*a* for feeding the sheets SH stacked in the feed tray 2.

A sensor 31 is a sensor for detecting the passing of the leading edge and trailing edge of the sheet SH, and is an optical sensor or the like. The detection position of the sensor 31 is set in a position on the downstream side of the nip portion of the feed unit 4.

The conveyance unit 5 is arranged on the upstream side of a printhead 12, and conveys the sheet SH fed by the feed unit 4 to the printhead 12. The conveyance unit 5 conveys the sheet SH to the downstream side between the printhead 12 and a platen 15 facing the printhead 12. The conveyance unit 5 includes a conveyor roller 5*a*, and a driven roller (pinch roller) 5*b* that is urged against the conveyor roller 5*a* by a spring or the like (not shown). The conveyor roller 5*a* is a rotational member that rotates by the driving force of a conveyor motor 24, and the driven roller 5*b* is a rotational member that rotates following the rotation of the conveyor roller 5*a*. The sheet SH is nipped by a nip portion between the conveyor roller 5*a* and the driven roller 5*b*, and conveyed by the rotations of the conveyor roller 5*a* and the driven roller 5*b*.

The conveyance unit 6 is arranged on the downstream side of the printhead 12, and conveys the sheet SH conveyed by the conveyance unit 5 to the downstream side. The conveyance unit 6 includes a conveyor roller 6*a*, and a spur 6*b* that is urged against the conveyor roller 6*a* by a spring or the like (not shown). The conveyor roller 6*a* is a rotational member that rotates by the driving force of the conveyor motor 24, and the spur 6*b* is a rotational member that rotates following the rotation of the conveyor roller 6*a*. In this embodiment, the conveyance units 5 and 6 share the driving source (the motor 24).

The conveyance unit 7 is arranged on the downstream side of the printhead 12 and the conveyance unit 6, and conveys the sheet SH conveyed by the conveyance unit 6 to the downstream side. The conveyance unit 7 includes a conveyor roller 7*a*, and a driven roller 7*b* that is urged against the conveyor roller 7*a* by a spring or the like (not shown). The conveyor roller 7*a* is a rotational member that rotates by the driving force of a conveyor motor 25, and the driven roller 7*b* is a rotational member that rotates following the rotation of the conveyor roller 7*a*. The sheet SH is nipped by a nip portion between the conveyor roller 7*a* and the driven roller 7*b*, and conveyed by the rotations of the conveyor roller 7*a* and the driven roller 7*b*.

The conveyance unit 8 is arranged on the downstream side of the printhead 12 and the conveyance units 6 and 7, and is a discharge unit for discharging the sheet SH conveyed by the conveyance unit 7 to the discharge tray 17. The conveyance unit 8 includes a conveyor roller 8*a*, and a driven roller 8*b* that is urged against the conveyor roller 8*a* by a spring or the like (not shown). The conveyor roller 8*a* is a rotational member that rotates by the driving force of the conveyor motor 25, and the driven roller 8*b* is a rotational member that rotates following the rotation of the conveyor roller 8*a*. The sheet SH is nipped by a nip portion between the conveyor roller 8a and the driven roller 8b, and conveyed by the rotations of the conveyor roller 8a and the driven roller 8b. In this embodiment, the conveyance units 7 and 8 share the driving source (the motor 25).

A flapper 16 is arranged in the branch point BP. The flapper 16 switches the routes to the conveyance destinations of the sheet SH between the main conveyance route RT1 and the sub-conveyance route RT2. In the position shown in FIG. 1, the flapper 16 maintains the route to the conveyance destination of the sheet SH to the main conveyance route RT1, and the sheet SH is discharged to the discharge tray 17 via the conveyance unit 8. The flapper 16 is formed to be able to pivot, and switches the routes by pivoting by an actuator 27 such as an electromagnetic solenoid.

The conveyance unit 9 is an inversion unit for conveying the sheet SH having entered the sub-conveyance route RT2 from the branch point BP. The sub-conveyance route RT2 has an inversion route RT21 extending upward from the branch point BP via a branch point BP', and a return route RT22 extending from the branch point BP' to the feed unit 4. The conveyance unit 9 is arranged in the inversion route RT21.

The conveyance unit 9 includes a conveyor roller 9a, and a driven roller 9b that is urged against the conveyor roller 9a by a spring or the like (not shown). The conveyor roller 9a is a rotational member that rotates by the driving force of a conveyor motor 26, and the driven roller 9b is a rotational member that rotates following the rotation of the conveyor roller 9a.

The sheet SH having entered the sub-conveyance route RT2 from the branch point BP moves in the inversion route RT21. The conveyor roller 9a is rotated in two directions, that is, a direction R1 and an opposite direction R2. When the conveyor roller 9a rotates in the direction R1, the sheet SH is conveyed in the direction of an arrow F. When the trailing edge of the sheet SH passes the branch point BP', the rotational direction of the conveyor roller 9a is switched to the direction R2. The sheet SH is conveyed in the opposite direction. The sheet SH is supplied from the branch point BP' to the return route RT22 while the obverse and reverse surfaces of the sheet SH are inverted.

The conveyance unit 10 is an intermediate unit arranged in the return route RT22. The conveyance unit 10 includes a conveyor roller 10a, and a driven roller 10b that is urged against the conveyor roller 10a by a spring or the like (not shown). The conveyor roller 10a is a rotational member that rotates by the driving force of the conveyor motor 26, and the driven roller 10b is a rotational member that rotates following the rotation of the conveyor roller 10a. The sheet SH is nipped by a nip portion between the conveyor roller 10a and the driven roller 10b, and conveyed by the rotations of the conveyor roller 10a and the driven roller 10b. In this embodiment, the conveyance units 9 and 10 share the driving source (the motor 26). Note that the conveyor roller 10a is a one-way roller. Therefore, after the sheet SH is conveyed to a position exceeding the nip portion of the feed unit 4, conveyance by the feed unit 4 can be continued even when driving of the conveyor roller 10a is stopped.

The printhead 12 is arranged midway along the main conveyance route RT1. In this embodiment, the printhead 12 is arranged in a position on the downstream side of the conveyance unit 5 and on the upstream side of the conveyance unit 6. The printhead 12 performs printing on the sheet SH. The sheet SH is conveyed in the X direction in the vicinity of the printhead 12. In this embodiment, the printhead 12 is an inkjet printhead that performs printing on a print medium by ejecting ink. The printhead 12 is supported by a carriage 11.

The carriage 11 is moved back and forth by a driving unit 14 in a direction crossing the sheet SH (a direction crossing the conveyance direction of the sheet SH in the vicinity of the printhead 12). In this embodiment, the carriage 11 moves back and forth in the Y direction by being guided by a guide shaft 13 extended in the Y direction.

The driving unit 14 is a mechanism using a carriage motor 21 as a driving source, and is a transmission mechanism including a driving pulley and a driven pulley separated in the Y direction, and an endless belt wound around these pulleys. The carriage 11 is connected to the endless belt. When the carriage motor 21 rotates the driving pulley, the endless belt runs and the carriage 11 moves. The printhead 12 can also be attached to the carriage 11 so that the printhead 12 can be exchanged.

As described above, the printing apparatus 1 of this embodiment is a serial-type printing apparatus in which the printhead 12 is mounted on the carriage 11. Printing control on the sheet SH is performed by alternately repeating an intermittently performed conveyance operation (intermittent conveyance operation) in which the conveyance unit 5 and/or the conveyance unit 6 conveys a print medium by a predetermined amount, and a printing operation that is performed while the conveyance by the conveyance unit 5 and/or the conveyance unit 6 is stopped. The printing operation is an operation of ejecting ink from the printhead 12 while moving the carriage 11 on which the printhead 12 is mounted.

<Control Unit>

Figure 2:
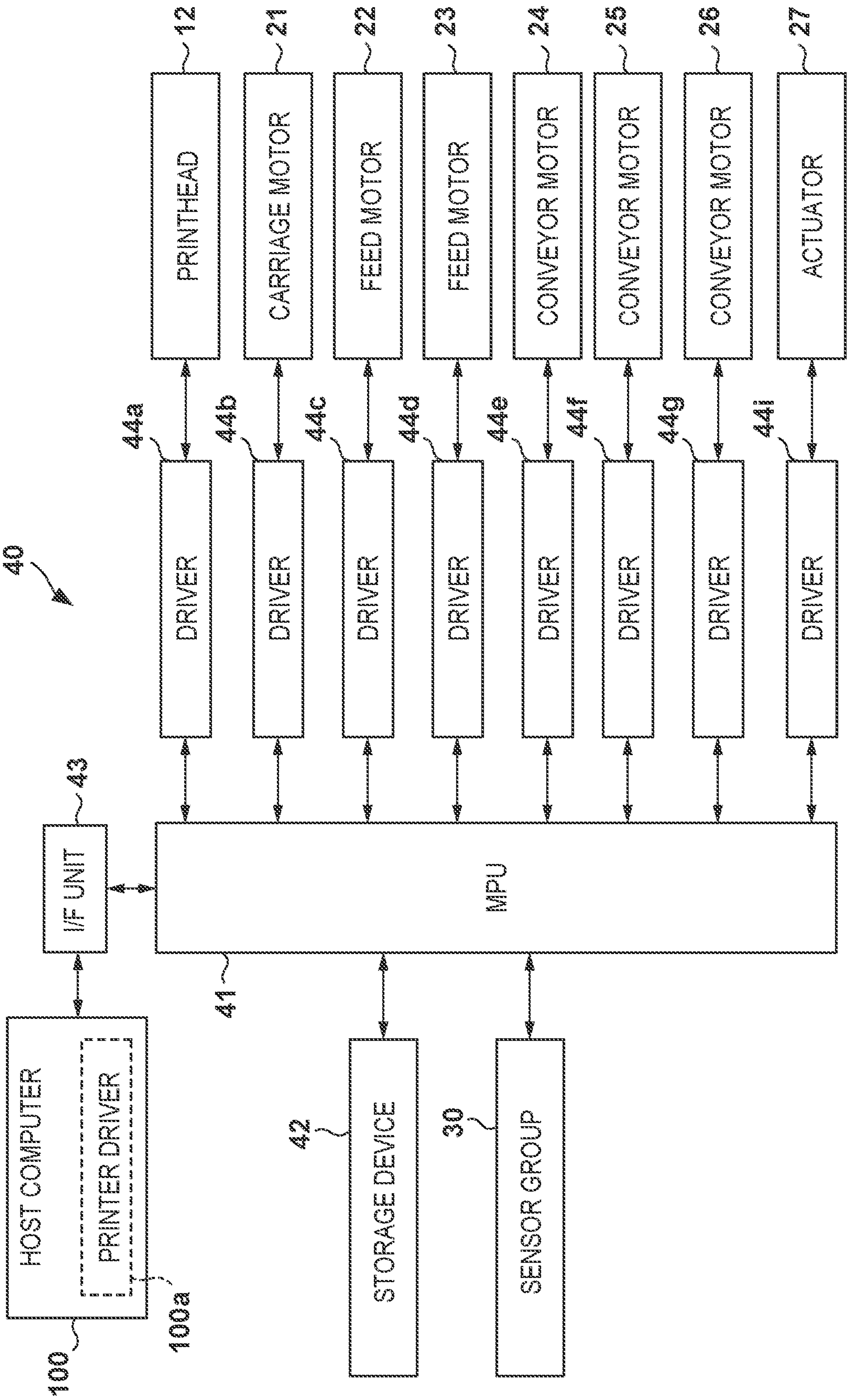
FIG. 2 is a block diagram of a control unit of the printing apparatus shown in FIG. 1.

FIG. 2 is a block diagram of a control unit 40 of the printing apparatus 1. An MPU 41 is a processor for controlling each operation of the printing apparatus 1 and controlling data processing and the like. The MPU 41 controls the whole printing apparatus 1 by executing a program stored in a storage device 42. The storage device 42 is, for example, a ROM or a RAM. The storage device 42 stores the program to be executed by the MPU 41, and also stores various kinds of data necessary for processing, such as data received from a host computer 100.

The MPU 41 controls the printhead 12 via a driver 44a. The MPU 41 controls the carriage motor 21 via a driver 44b. The MPU 41 also controls the feed motors 22 and 23, the conveyor motors 24 to 26, and the actuator 27 via drivers 44c to 44i.

A sensor group 30 includes the sensor 31, a sensor (not shown) for detecting the position of the carriage 11 in the Y direction, and sensors (not shown) for detecting the rotation amounts of the feed motors 22 and 23 and the conveyor motors 24 to 26. By detecting the rotation amount of each motor, it is possible to specify the rotation amount of a corresponding feed roller or conveyor roller, and calculate the conveyance amount of the sheet SH.

The host computer 100 is, for example, a personal computer or a portable terminal (for example, a smartphone or a tablet terminal) that is used by the user. A printer driver 100a for performing communication between the host computer 100 and the printing apparatus 1 is installed in the host computer 100. The printing apparatus 1 includes an I/F (interface) unit 43, and the communication between the host computer 100 and the MPU 41 is executed via the I/F unit 43.

In a case where, for example, the user inputs execution of printing control to the host computer 100, the printer driver 100a generates a print job by gathering data of an image to be printed, and the printing conditions (various pieces of information such as the quality of a printed image), and transmits the print job to the printing apparatus 1.

<Control Example>

An example of control to be executed by the MPU 41 will be explained below. When the host computer 15 transmits a print job via the I/F unit 43, the MPU 41 processes the print job and expands the processed data on the storage device 42. The MPU 41 starts the control based on the expanded data.

<Printing Conditions>

FIGS. 3A and 3B show examples of printing conditions related to the conveyance operation of the sheet SH, among printing conditions contained in the print job. The printing apparatus 1 of this embodiment can perform both single-sided printing and double-sided printing. FIG. 3A shows an example of printing conditions when performing double-sided printing on two sheets SH, and FIG. 3B shows an example of printing conditions when performing single-sided printing on three sheets SH. Note that as a printing order, a facedown method in which an immediately preceding printing surface in a facedown state is discharged to the discharge tray 17 is assumed, but a faceup method is also usable.

"Printing Order N" indicates the number of times and the order of printing control for one surface of the sheet SH, and N is a variable. Printing control is executed for four surfaces (four times) in the example shown in FIG. 3A, and three surfaces (three times) in the example shown in FIG. 3B.

"Page Number K" indicates a page of the final printed product to which the printing order N corresponds, and K is a variable. "Sheet M" indicates a target sheet SH of the printing order N, and M is a variable. In this embodiment, a number is given in the order of feed from the feed tray 2. A sheet SH1 indicates the sheet SH fed first from the feed tray 2 in the print job, a sheet SH2 indicates the sheet SH fed second from the feed tray 2, and a sheet SH3 indicates the sheet SH fed third from the feed tray 2.

The variable M is sometimes represented as M(N) as a function of the printing order N. In the example shown in FIG. 3A, M(1) means the sheet SH1, M(2) means the sheet SH2, and M(3) means the sheet SH1. In the example shown in FIG. 3B, M(3) means the sheet SH3.

"Printing Surface F" indicates which one of the obverse and reverse surfaces (in other words, the first and second surfaces) of the sheet SH is a printing target surface, and is sometimes represented as F(N) as a function of the printing order N. In the example shown in FIG. 3A, F(1) means that the reverse surface of the sheet SH1 is a printing target surface, and F(3) means that the obverse surface of the sheet SH1 is a printing target surface.

"Feed Source Q" indicates which of the feed tray 2 or the sub-conveyance route RT2 is the feed source of the sheet SH, and is sometimes represented as Q(N) as a function of the printing order N. When performing double-sided printing in this embodiment, after the reverse surface is printed, the sheet SH is inverted in the inversion route RT21 of the sub-conveyance route RT2, and returned to the feed unit 4 via the return route RT22. In double-sided printing, the feed tray 2 or the sub-conveyance route RT2 is the feed source. In single-sided printing, the feed tray 2 is always the feed source.

"Post-Printing Processing G" indicates whether the processing of the printing sheet SH is discharge to the discharge tray 17 or inversion in the sub-conveyance route RT2, and is sometimes represented as G(N) as a function of the printing order N. In single-sided printing, the processing G is always discharge. In double-sided printing, the processing G is inversion after the first surface is printed, and is discharge after the second surface is printed.

<Operation Examples>

Operation examples of the printing apparatus 1 will be explained below with reference to FIGS. 4A to 14B. More specifically, operation examples when performing double-sided printing on two sheets SH in accordance with the printing conditions shown in FIG. 3A will be explained.

Figure 4A:
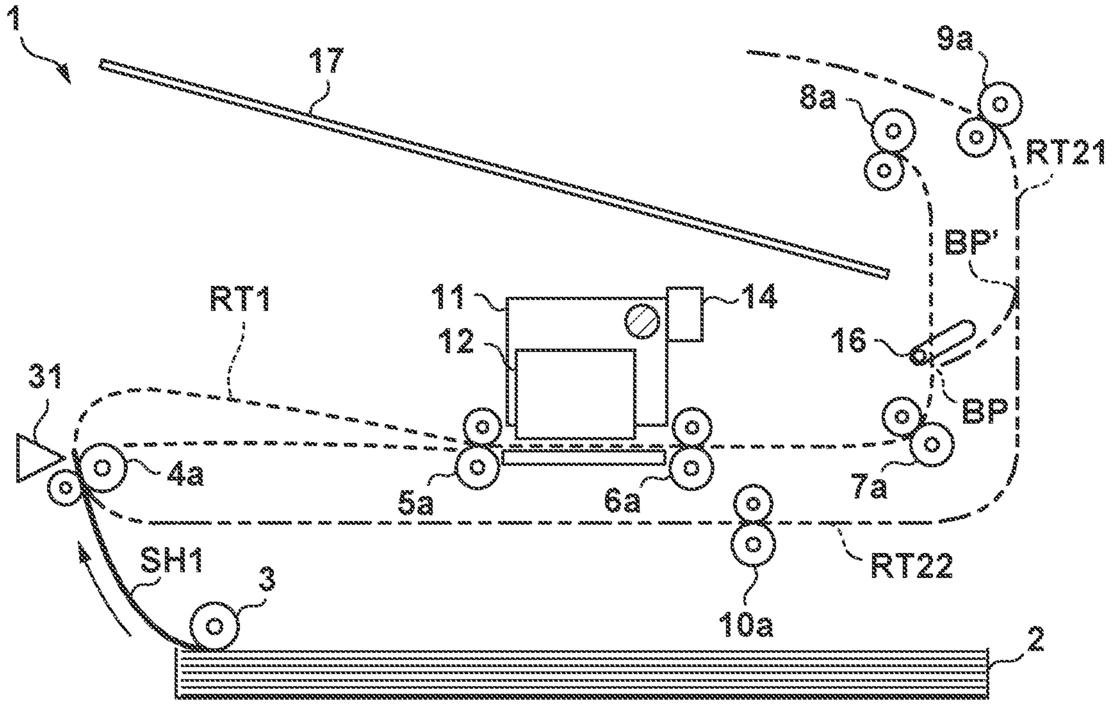
FIGS. 4A and 4B are views for explaining the operation of the printing apparatus shown in FIG. 1.

Referring to FIG. 4A, since the printing conditions shown in FIG. 3A indicate double-sided printing, the flapper 16 is moved beforehand so as to guide the sheet SH to the sub-conveyance route RT2. The feed motor 22 is driven at low speed. Consequently, the pickup roller 3 is rotated at, for example, 7.6 inches/sec (the conveyance velocity of the sheet SH, and the same expression has the same meaning hereinafter). When the pickup roller 3 rotates, the uppermost one of the sheets SH stacked in the feed tray 2 is picked up. This sheet is represented as a sheet SH1.

The sheet SH1 picked up by the pickup roller 3 is conveyed in the main conveyance route RT1 by the feed roller 4*a* rotating in the same direction as the pickup roller 3. The feed motor 23 drives the feed roller 4*a* at the same speed as the pickup roller 3. The pickup roller 3 conveys the sheet SH1 to a position exceeding the feed roller 4*a*, and stops so as not to pick up the next sheet SH. As described above, the pickup roller 3 is a one-way roller, so the feed roller 4*a* can continue feeding even when the pickup roller 3 stops.

When the sensor 31 installed on the downstream side in the conveyance direction of the feed roller 4*a* detects the leading edge of the sheet SH1, the feed motor 23 is switched to high-speed driving. The feed roller 4*a* rotates at, for example, 20 inches/sec.

Figure 4B:
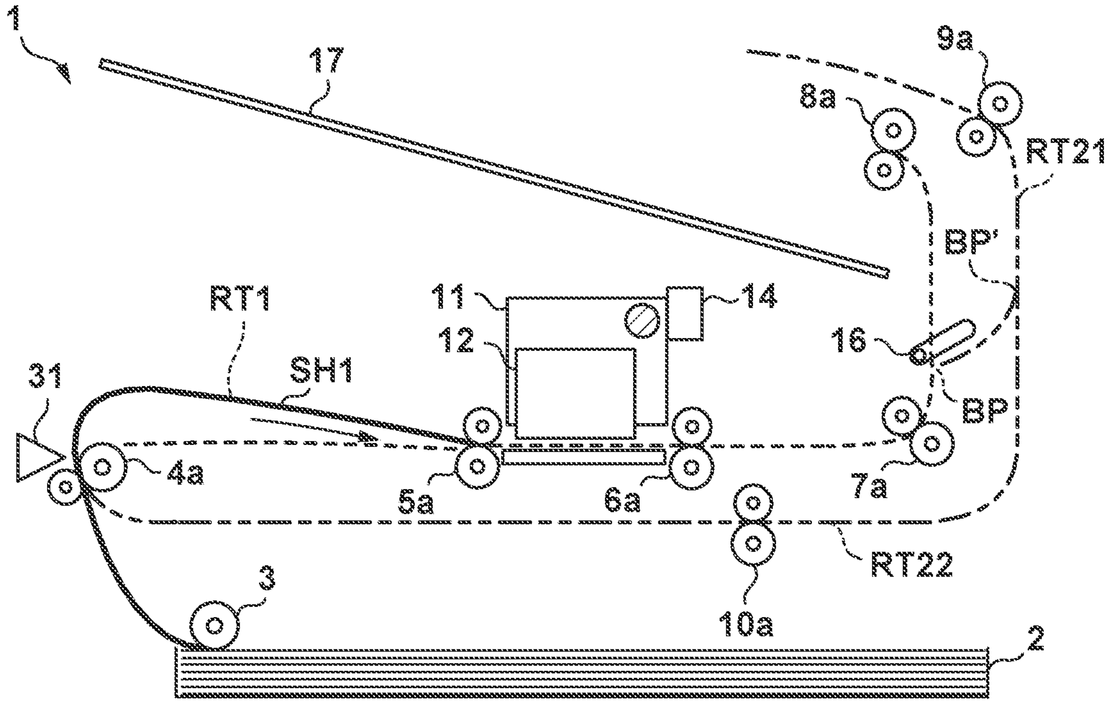

Referring to FIG. 4B, when the feed roller 4*a* continues feeding of the sheet SH1, the leading edge of the sheet SH1 abuts against the nip portion formed by the conveyor roller 5*a* and the pinch roller 5*b*. In this state, the conveyor roller 5*a* is standing still. By rotating the feed roller 4*a* by a predetermined amount even after the leading edge of the sheet SH1 abuts against the nip portion, the whole widthwise region of the leading edge of the sheet SH1 abuts against the nip portion, so a skew of the sheet SH1 can be corrected (a skew correcting operation).

When this skew correcting operation on the sheet SH1 is complete, the conveyor motor 24 is driven, so the conveyor roller 5*a* starts rotating. The conveyor roller 5*a* conveys the sheet SH1 at, for example, 15 inches/sec. Printing control can be started when the sheet SH1 is aligned in the position facing the printhead 12. As indicated by the condition N=1 in FIG. 3A, an operation of printing print data of the second page is started on the reverse surface (upper surface) of the sheet SH1.

Note that when the leading edge of the sheet SH1 is abutted against the nip portion of the conveyance unit 5, the leading edge of the sheet SH1 is positioned once in the position of the conveyor roller 5*a*. Based on this position, the positions of the leading edge and trailing edge of the sheet SH1 can be calculated by the rotation amount of the conveyor roller Sa after that. This position control conveys the sheet SH1 to the position facing the printhead 12 in alignment as well.

As described above, the printing apparatus 1 of this embodiment is a serial-type printing apparatus in which the printhead 12 is mounted on the carriage 11. Printing on the sheet SH1 is performed by repeating a conveyance operation in which the conveyor roller 5*a* intermittently conveys a print medium by a predetermined amount each time, and a printing operation in which the printhead 12 ejects ink while the carriage 11 is moved. When the sheet SH1 is aligned, the feed motor 23 is switched to low-speed driving. That is, the feed roller 4*a* rotates at, for example, 7.6 inches/sec. While the conveyor roller 5*a* is intermittently conveying the sheet SH1 by the predetermined amount each time, the feed motor 23 also intermittently drives the feed roller 4*a*. That is, the feed roller 4*a* rotates when the conveyor roller 5*a* rotates, and the feed roller 4*a* is standing still when the conveyor roller 5*a* is standing still. The rotational speed of the feed roller 4*a* is lower than that of the conveyor roller 5*a*. Accordingly, the sheet SH is pulled tight between the conveyor roller 5*a* and the feed roller 4*a*. Also, the feed roller 4*a* is co-rotated by the conveyor roller 5*a* via the sheet SH1.

Figure 5A:
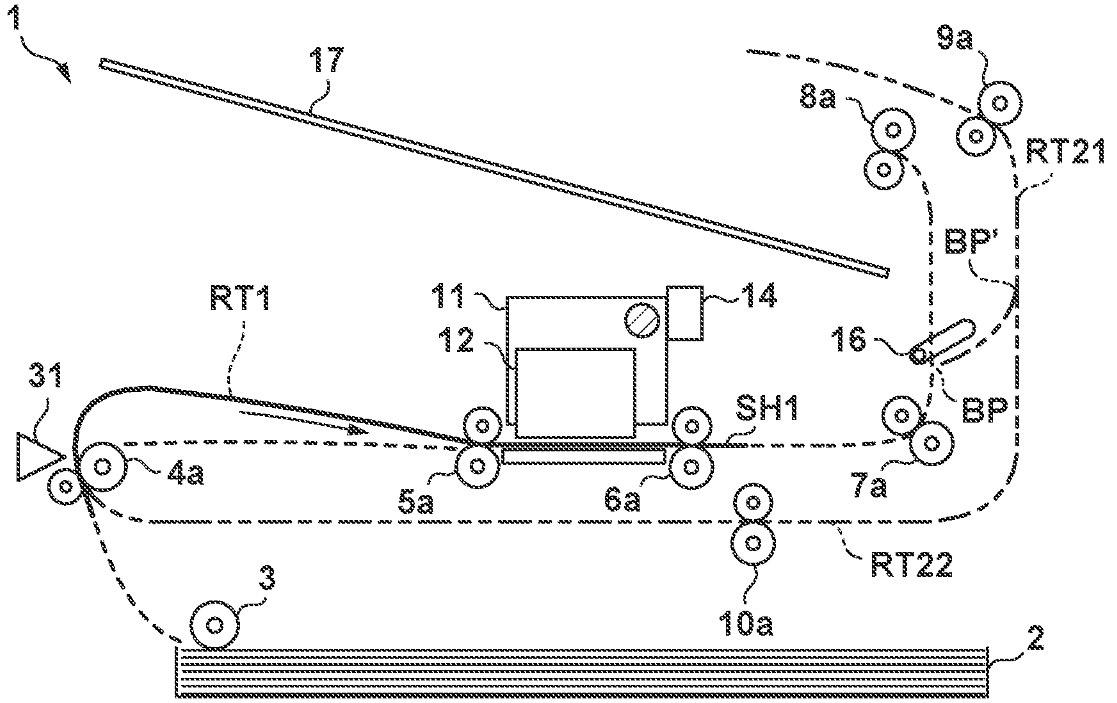
FIGS. 5A and 5B are views for explaining the operation of the printing apparatus shown in FIG. 1.
Figure 5B:
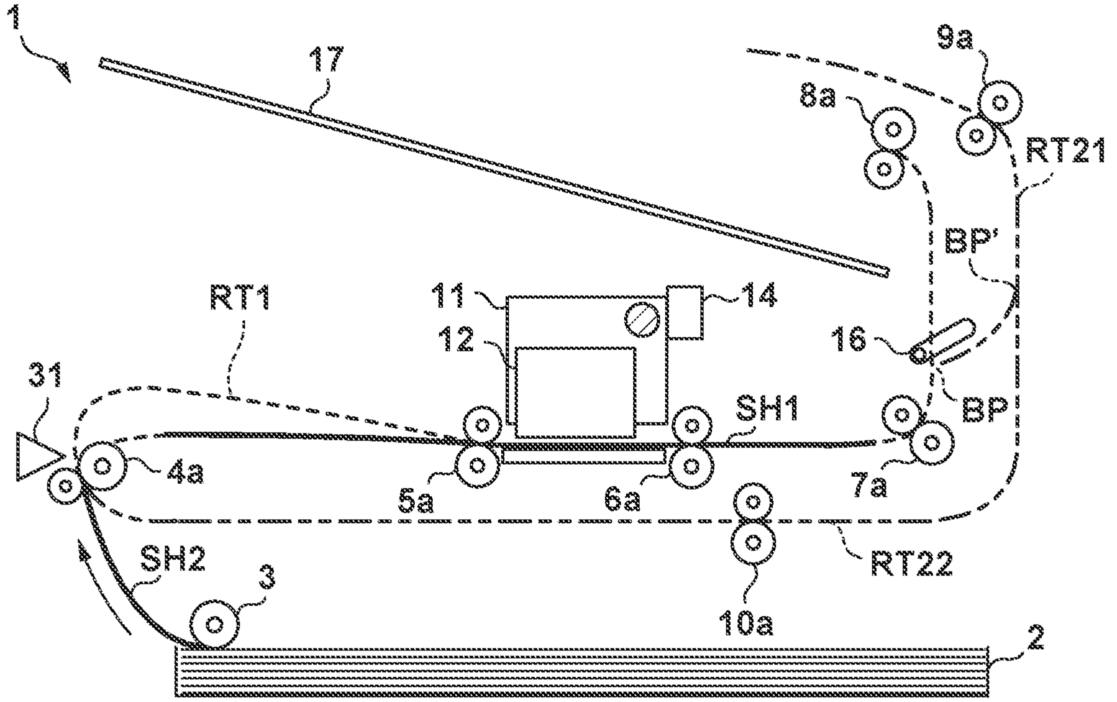

When printing on the sheet SH1 advances, the leading edge of the sheet SH1 arrives at the conveyance unit 6. Since the conveyor roller 6*a* shares the conveyor motor 24 as a driving source with the conveyor roller 5*a*, synchronous control is performed. FIG. 5B shows a state in which the leading edge of the sheet SH1 has passed the conveyor roller 6*a*.

Then, feeding of the sheet SH2 is started following the sheet SH1. To detect the edge portion of the sheet SH, the sensor 31 requires a predetermined interval between successive sheets SH due to a cause such as the responsiveness of the sensor. Accordingly, the pickup operation of the sheet SH2 is started after the trailing edge of the sheet SH1 is detected by the sensor 16 and it is determined that the sheet SH1 has passed the sensor 16. Also, when feeding the sheet SH2, the rotation of the pickup roller 3 is so controlled that the interval between the trailing edge of the sheet SH1 and the leading edge of the sheet SH2 is a predetermined distance or more. In this embodiment, the positions of the leading edge and trailing edge of the sheet SH are specified by calculations based on the rotation amounts of the various rollers. However, these positions can also be calculated by installing another sensor.

Referring to FIG. 5B, the trailing edge of the sheet SH1 has passed the feed roller 4*a* and is slightly hanging down. The sheet SH2 picked up by the pickup roller 3 is conveyed by the feed roller 4*a*. In this state, printing control is executed in parallel on the sheet SH1. When the sensor 31 detects the leading edge of the sheet SH2, the feed motor 23 is switched to high-speed driving. That is, the feed roller 4*a* rotates at, for example, 20 inches/sec.

Note that while the conveyor rollers 5*a* and 6*a* are intermittently conveying the sheet SH1 by a predetermined amount each time, the conveyor motors 25 and 26 intermittently drive the conveyor rollers 7*a* and 9*a* in the same direction and at the same speed as those of the conveyor roller 5*a*.

Figure 6A:
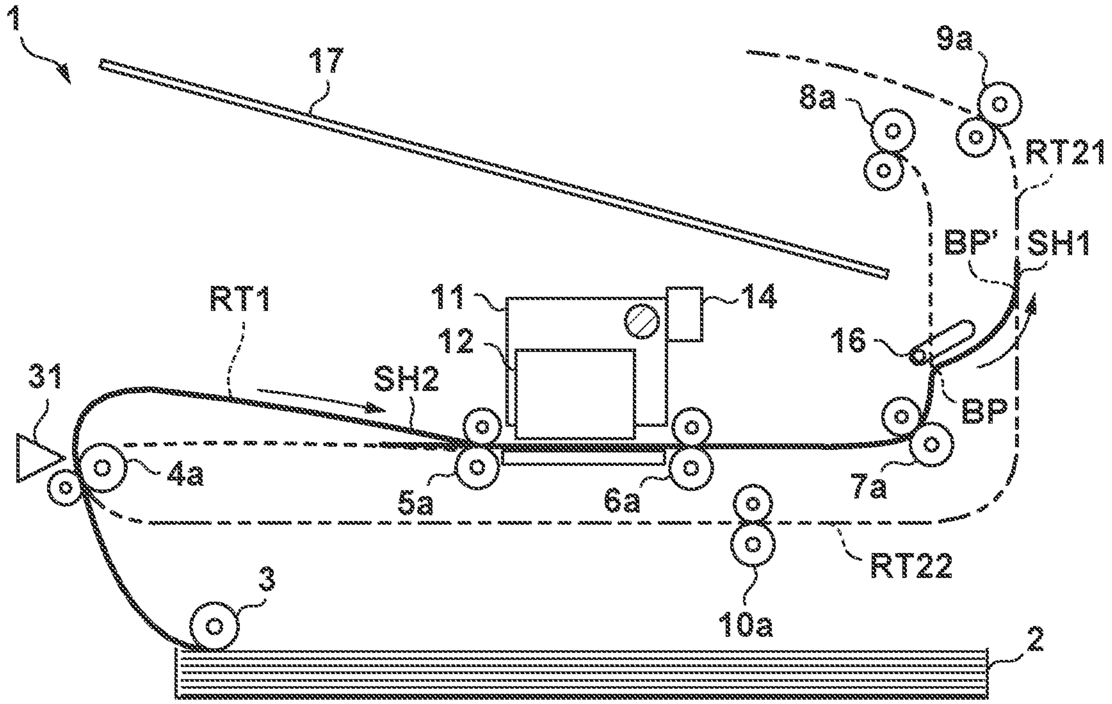
FIGS. 6A and 6B are views for explaining the operation of the printing apparatus shown in FIG. 1.

In this embodiment, overlap state formation control can be executed. Referring to FIG. 6A, the sheet SH2 is fed at a speed higher than the conveyance velocity of the sheet SH1, thereby forming an overlap state in which the leading edge of the sheet SH2 overlaps the trailing edge of the sheet SH1 before the conveyor roller 5*a*. Since printing control is performed on the sheet SH1 based on the print data, the conveyor roller 5*a* intermittently conveys the sheet SH1. On the other hand, after the trailing edge of the sheet SH2 is detected by the sensor 31, the sheet SH2 can catch up with the sheet SH1 by continuously rotating the feed roller 4*a* at 20 inches/sec. After that, the sheet SH2 is conveyed until the leading edge arrives at a predetermined position slightly before the nip portion of the conveyance unit 5. The position of the leading edge of the sheet SH2 is calculated from the rotation amount of the feed roller 4*a* since the leading edge of the sheet SH2 is detected by the sensor 31, and is controlled based on this calculation result. The sheet SH1 has entered the sub-conveyance route RT2 by being guided by the flapper 16.

Then, a skew correcting operation is performed on the sheet SH2. While the conveyor roller 5*a* is standing still in order to perform the printing operation on the sheet SH1, the leading edge of the sheet SH2 is abutted against the nip portion by driving the feed roller 4*a*. In this embodiment, the skew correcting operation for the sheet SH2 is performed while the conveyor roller 5*a* is standing still for the printing operation for the last line of the sheet SH1, in order to minimize the influence on the printing quality of the sheet SH1.

Figure 6B:
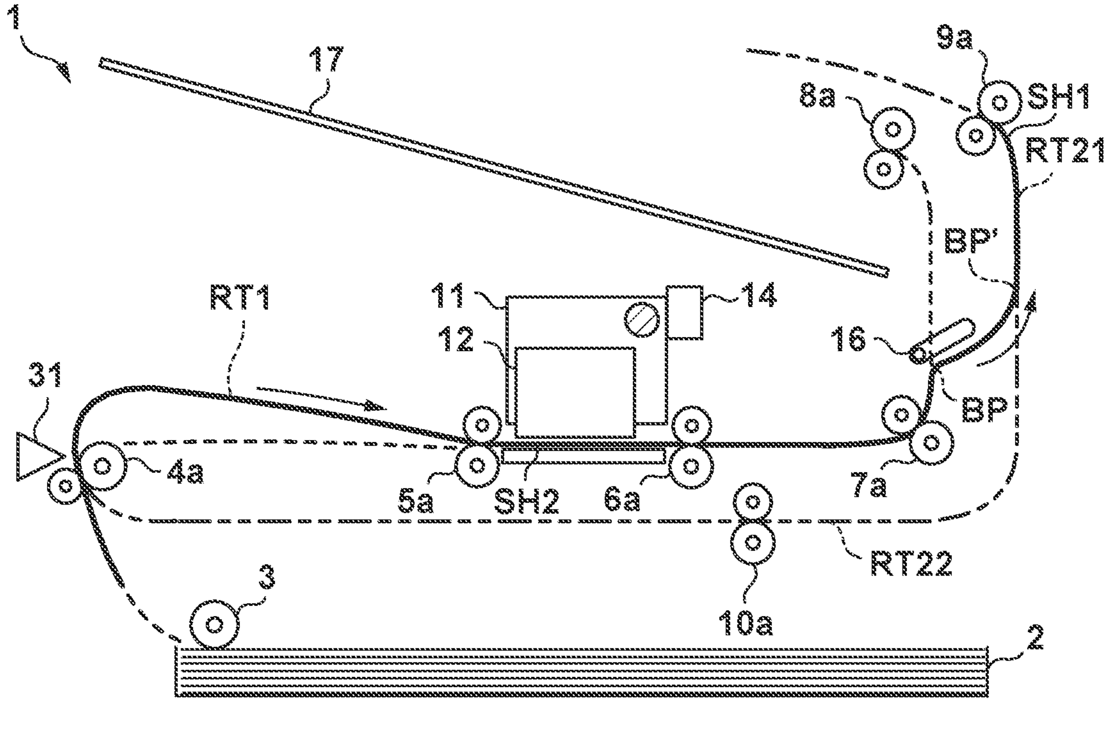

Referring to FIG. 6B, when the printing operation for the last line of the sheet SH1 is complete, the sheet SH2 can be aligned while maintaining the state in which the sheet SH2 overlaps the sheet SH1 by rotating the conveyor roller 5*a* by a predetermined amount. Note that the overlap portion of the sheets SH1 and SH2 is conveyed as it is nipped by the nip portion of the conveyance unit 5.

When the sheet SH2 is aligned, the feed motor 23 is switched to low-speed driving. That is, the feed roller 4*a* rotates at, for example, 7.6 inches/sec. While the conveyor roller 5*a* is intermittently conveying the sheet SH2 by a predetermined amount each time, the feed motor 23 also intermittently drives the feed roller 4*a*. As indicated by the condition N=2 in FIG. 3A, an operation of printing the print data of the fourth page is performed on the reverse surface (upper surface) of the sheet SH2. When the sheet SH2 is intermittently conveyed for this printing operation, the sheet SH1 is also intermittently conveyed.

In this embodiment, overlap amount reduction control can be executed. When the overlap portion of the sheets SH1 and SH2 passes the branch point BP, a paper jam may occur. For example, when the sheets SH1 and SH2 are conveyed to different routes from the branch point BP, the sheet SH2 may interfere with the sheet SH1 and cause a paper jam depending on the vertical relationship between the sheets SH1 and SH2. An example is a case in which while the sheet SH1 passes the branch point BP along the main conveyance route RT1, the succeeding sheet SH2 overlapping the sheet SH1 is conveyed to the sub-conveyance route RT2.

Accordingly, reduction control for reducing the overlap amount is performed before the overlap portion arrives at the branch point BP (in other words, before the sheet SH2 arrives at the branch point BP). In this embodiment, the overlap amount is reduced to 0. However, even when the overlap amount is not reduced to 0, a predetermined effect can be obtained if the overlap amount can be reduced.

Figure 7A:
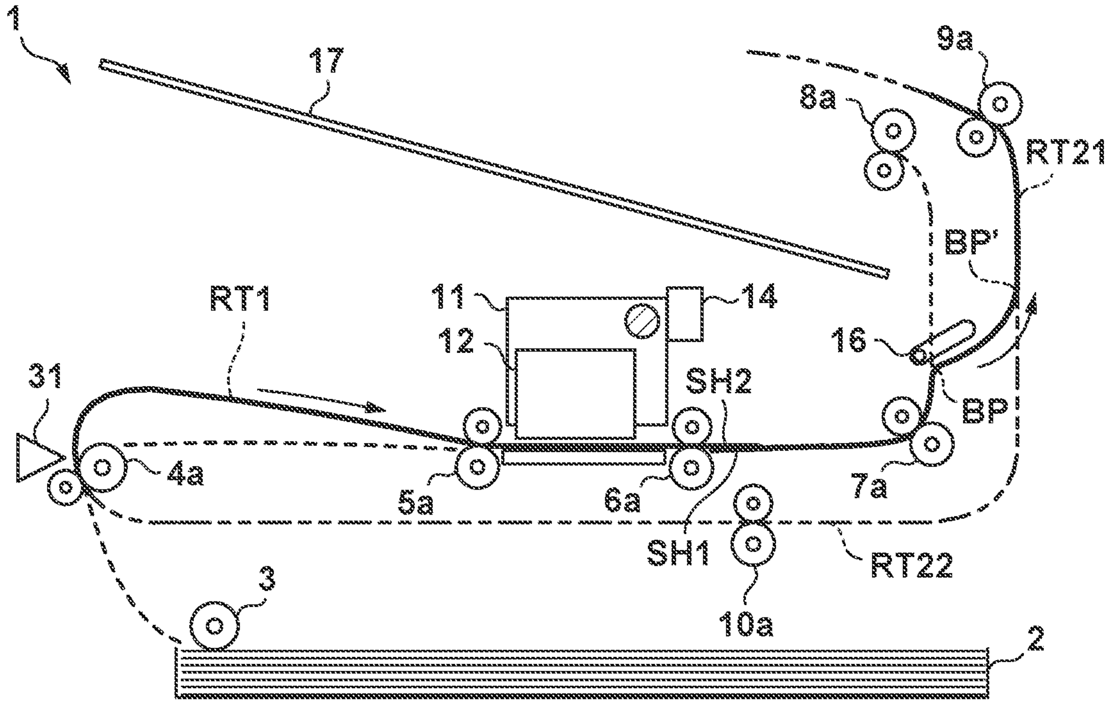
FIGS. 7A and 7B are views for explaining the operation of the printing apparatus shown in FIG. 1.

Referring to FIG. 7A, whether the trailing edge of the sheet SH1 has passed the conveyor roller 6*a* is determined from the rotation amount of the conveyor roller 5*a* since the start of the operation of aligning the sheet SH1, and from the length of the sheet SH1. As shown in FIG. 7A, at the timing at which the trailing edge of the sheet SH1 passes the conveyor roller 6*a*, the conveyor roller 7*a* can convey the preceding sheet SH1, and the conveyor rollers 5*a* and 6*a* can convey the succeeding sheet SH2. At this timing, the conveyor rollers 5*a* and 6*a* have no influence on the conveyance of the sheet SH1, and the conveyor roller 7*a* has no influence on the conveyance of the sheet SH2. At this timing, reduction control is started.

In this reduction control, the conveyor motor 25 continuously rotates the conveyor roller 7*a* independently of the conveyor rollers 5*a* and 6*a*. Note that the conveyor roller 9*a* is rotated by the conveyor roller 26 at the same speed as that of the conveyor roller 7*a* in the R1 direction (see FIG. 1)

Figure 7B:
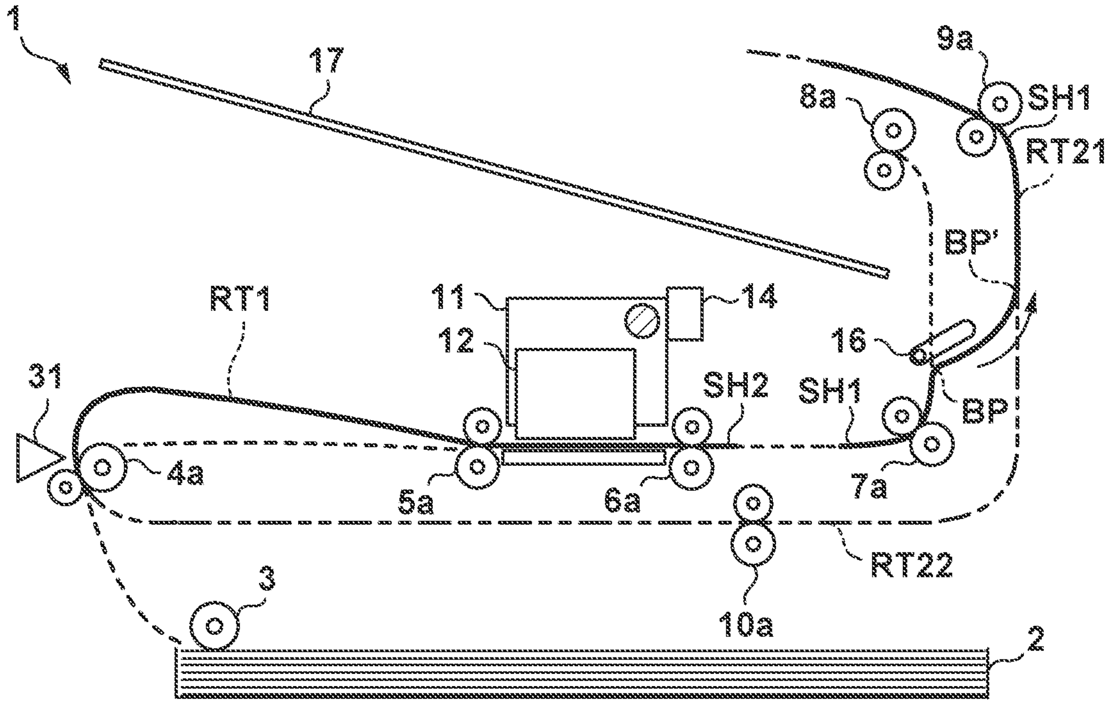

As shown in FIG. 7B, the trailing edge of the sheet SH1 can be separated from the sheet SH2 by the relative speed difference between the sheets SH1 and SH2. In this case, the speed of the conveyor roller 7*a* is controlled such that the reduction control can be completed before the trailing edge of the preceding sheet SH1 passes the conveyor roller 7*a*. Note that an example of this speed control will be described later.

The reduction control as described above can prevent the overlap portion of the sheets SH1 and SH2 from passing the branch point BP, thereby preventing the occurrence of a paper jam. Since the reduction control is executed during the printing control on the sheet SH2, the reduction control includes at least a control zone in which the conveyor rollers 5*a* and 6*a* stop conveying the succeeding sheet SH2 and the conveyor roller 7*a* conveys the preceding sheet SH1.

That is, the conveyance of the sheet SH2 is stopped during its printing operation. By continuously conveying the sheet SH1 during this printing operation, it is possible to maximize the relative speed difference between the sheets SH1 and SH2, and efficiently reduce the overlap amount. Accordingly, the speed of the conveyor roller 7*a* need not be higher than that of the conveyor roller 5*a* in order to reduce the overlap amount. The overlap amount of the sheets SH1 and SH2 can be reduced at a lower conveyance velocity of the sheet SH1. In other words, when the reduction control is performed during the printing operation, it is possible to reduce the conveyance velocity and suppress deterioration of the noise and electric power, compared to a case in which no reduction control is performed during the printing operation. In addition, if the reduction control is not completed during the printing operation of the sheet SH2, the reduction control can be performed during the conveyance operation of the sheet SH2 as well. In this case, the overlap amount can effectively be reduced because the speed of the conveyor roller 7*a* is higher than that of the conveyor roller 5*a*. It is, of course, needless to say that the reduction control can also be performed even when it is completed during the printing operation of the sheet SH2.

Figure 8A:
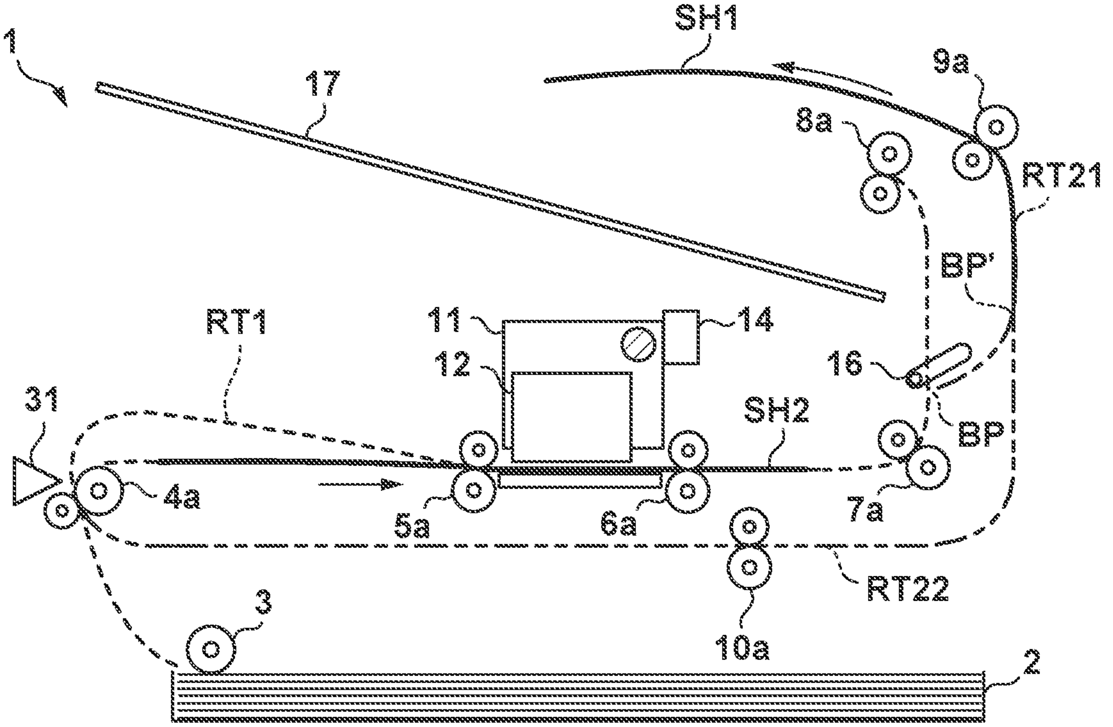
FIGS. 8A and 8B are views for explaining the operation of the printing apparatus shown in FIG. 1.
Figure 8B:
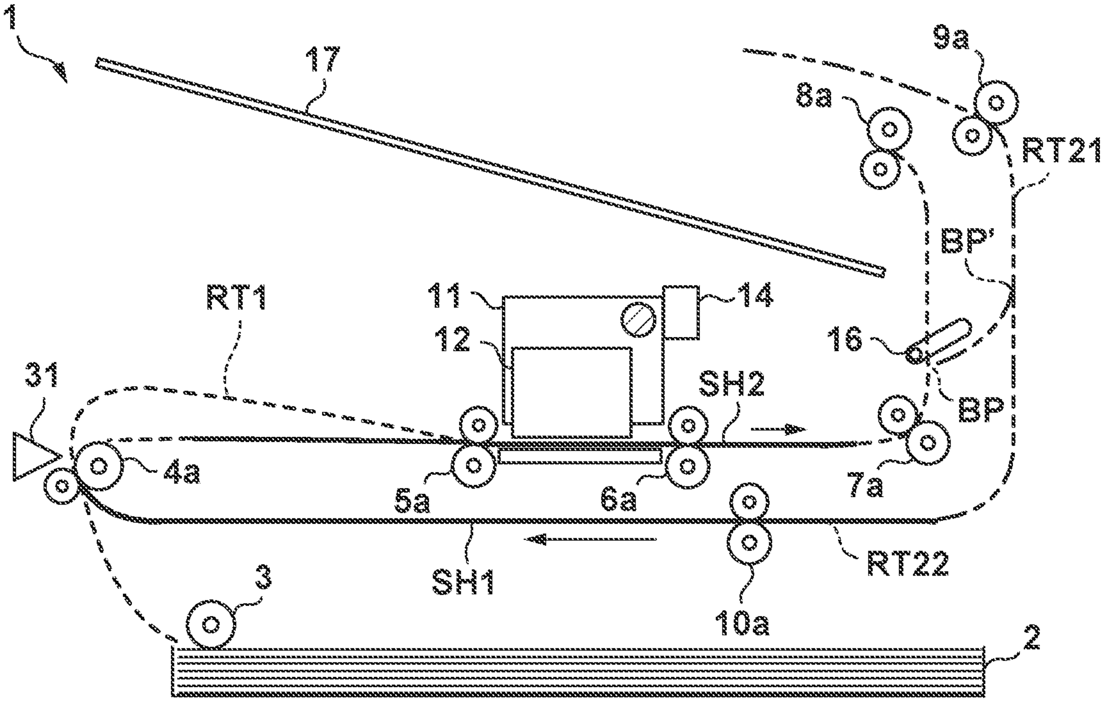

Referring to FIG. 8A, the conveyor roller 9*a* continuously conveys the sheet SH1 to a position where the trailing edge of the sheet SH1 passes the branch point BP'. When the trailing edge of the sheet SH1 passes the branch point BP', the conveyor motor 26 is reversed to the direction R2 (see FIG. 1), thereby switching driving to high-speed driving. In this conveyance direction, the leading edge and trailing edge of the sheet SH1 are switched. The conveyor rollers 9*a* and 10*a* are rotated at, for example, 18 inches/sec. The sheet SH1 enters the return route RT22 and is conveyed to the feed roller 4*a* as shown in FIG. 8B.

When the conveyance of the sheet SH1 advances and the sensor 31 detects the leading edge of the sheet SH1, the conveyor motor 26 and the feed motor 23 are driven at low speed. Consequently, the conveyor roller 10*a* and the feed roller 4*a* are rotated at, for example, 7.6 inches/sec. Then, the conveyor roller 10*a* and the feed roller 4*a* convey the sheet SH1 from the return route RT22 to the main conveyance route RT1.

Figure 9A:
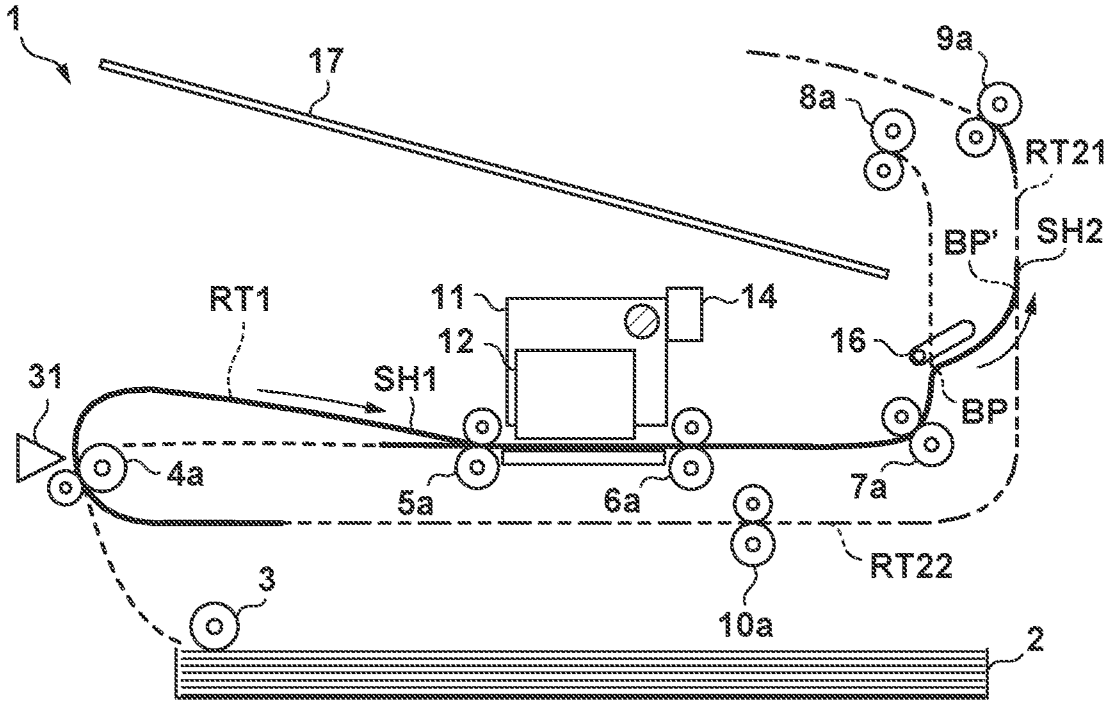
FIGS. 9A and 9B are views for explaining the operation of the printing apparatus shown in FIG. 1.

Subsequently, overlap state formation control is performed. Referring to FIG. 9A, the sheet SH2 is the preceding sheet and the sheet SH1 is the succeeding sheet, unlike in the case shown in FIG. 6A. Printing control is performed on the sheet SH2 based on the print data. When the sensor 31 detects the trailing edge of the sheet SH2, the conveyor motor 26 and the feed motor 23 are switched to high-speed driving. That is, the conveyor roller 10*a* and the feed roller 4*a* rotate at, for example, 20 inches/sec. An overlap state in which the leading edge of the sheet SH1 overlaps the trailing edge of the sheet SH2 is formed by rapidly moving the sheet SH1. Since printing control is performed on the sheet SH2 based on the print data, the conveyor roller 5*a* intermittently conveys the sheet SH2. On the other hand, after the sensor 31 detects the trailing edge of the sheet SH1, the sheet SH1 can catch up with the sheet SH2 by continuously rotating the feed roller 4*a* at 20 inches/sec. After that, the sheet SH1 is conveyed until its leading edge arrives at a predetermined position slightly before the nip portion of the conveyance unit 5. The position of the leading edge of the sheet SH1 is calculated from the rotation amount of the feed roller 4*a* since the sensor 31 detects the leading edge of the sheet SH1, and controlled based on the calculation result. The sheet SH2 enters the sub-conveyance route RT2 by being guided by the flapper 16.

Then, a skew correcting operation of the sheet SH1 is performed. When the conveyor roller 5*a* is standing still in order to perform the printing operation on the sheet SH2, the leading edge of the sheet SH1 is abutted against the nip portion by driving the feed roller 4*a*. In this embodiment, the skew correcting operation of the sheet SH1 is performed when the conveyor roller 5*a* is standing still in order to perform the operation of printing the last line on the sheet SH2, in order to minimize the influence on the printing quality of the sheet SH2.

Figure 9B:
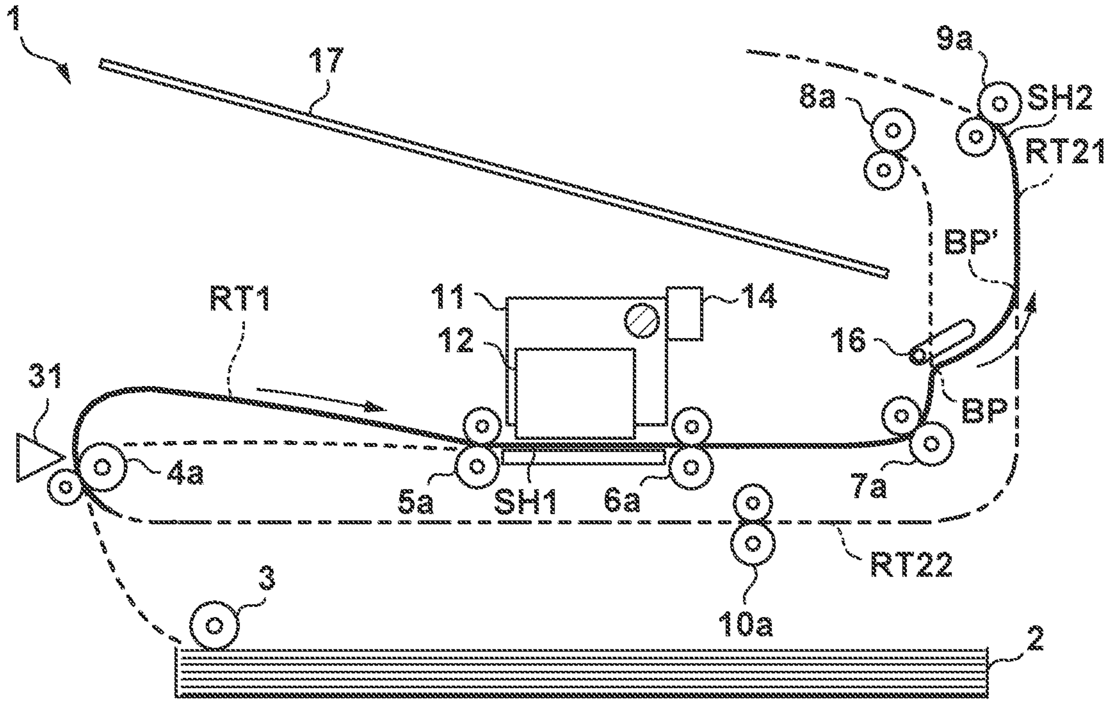

Referring to FIG. 9B, when the operation of printing the last line on the sheet SH2 is complete, the sheet SH1 can be aligned while maintaining the state in which the sheet SH1 overlaps the sheet SH2 by rotating the conveyor roller 5*a* by a predetermined amount. Note that the overlap portion of the sheets SH1 and SH2 is conveyed as it is nipped by the nip portion of the conveyance unit 5.

When the sheet SH1 is aligned, the feed motor 23 is switched to low-speed driving. That is, the feed roller 4*a* rotates at, for example, 7.6 inches/sec. When the conveyor roller 5*a* intermittently conveys the sheet SH2 by a predetermined amount each time, the conveyor motor 23 also intermittently drives the feed roller 4*a*. An operation of printing the print data of the first page on the obverse surface (upper surface) of the sheet SH1 is started by ejecting ink from the printhead 12 based on the print data. When the sheet SH1 is intermittently conveyed for this printing operation, the sheet SH2 is also intermittently conveyed.

Subsequently, overlap amount reduction control is performed. While the sheet SH2 is supplied to the sub-conveyance route RT2, the sheet SH1 is kept conveyed in the main conveyance route RT1 and discharged. At this timing, reduction control is performed again.

Figure 10A:
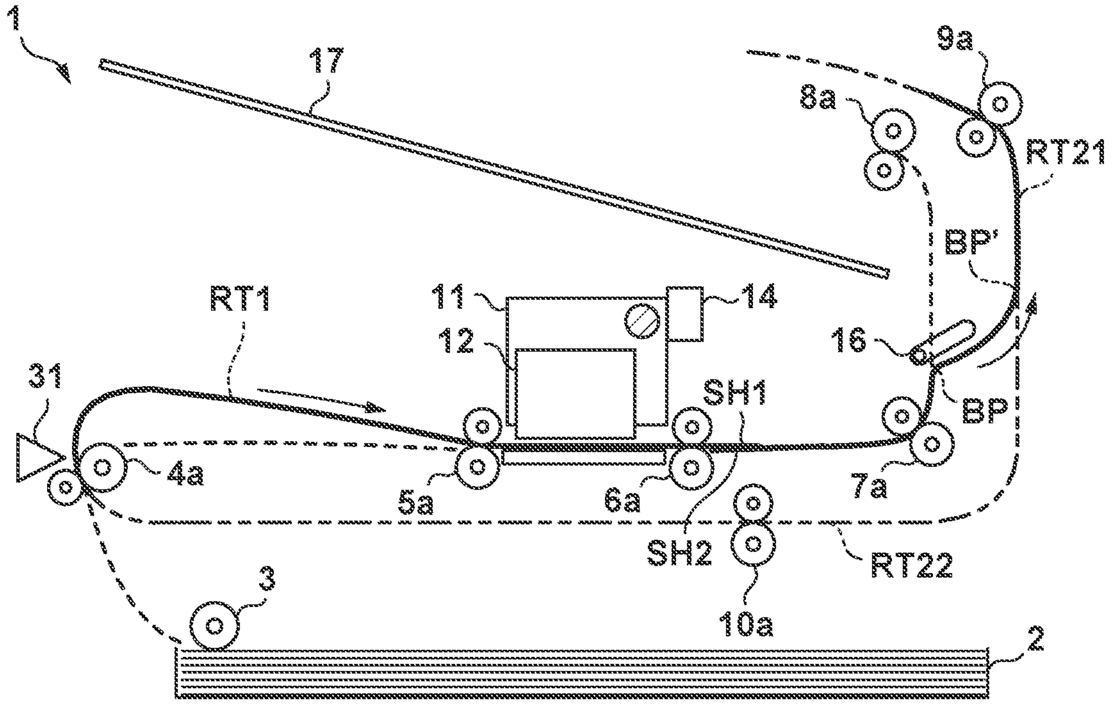
FIGS. 10A and 10B are views for explaining the operation of the printing apparatus shown in FIG. 1.

Referring to FIG. 10A, whether the trailing edge of the sheet SH2 has passed the conveyor roller 6*a* is determined from the rotation amount of the conveyor roller 5*a* since the start of the alignment operation on the sheet SH2, and from the length of the sheet SH2. As shown in FIG. 10A, at the timing at which the trailing edge of the sheet SH1 passes the conveyor roller 6*a*, the conveyor roller 7*a* can convey the preceding sheet SH2, and the conveyor rollers 5*a* and 6*a* can convey the succeeding sheet SH1. At this timing, the conveyor rollers 5*a* and 6*a* have no influence on the conveyance of the sheet SH2, and the conveyor roller 7*a* has no influence on the conveyance of the sheet SH1. Reduction control is started at this timing.

In this reduction control, the conveyor motor 25 continuously rotates the conveyor roller 7*a* independently of the conveyor rollers 5*a* and 6*a*. Note that the conveyor motor 26 rotates the conveyor roller 9*a* as well in the direction R1 (see FIG. 1) at the same speed as that of the conveyor roller 7*a*.

Figure 10B:
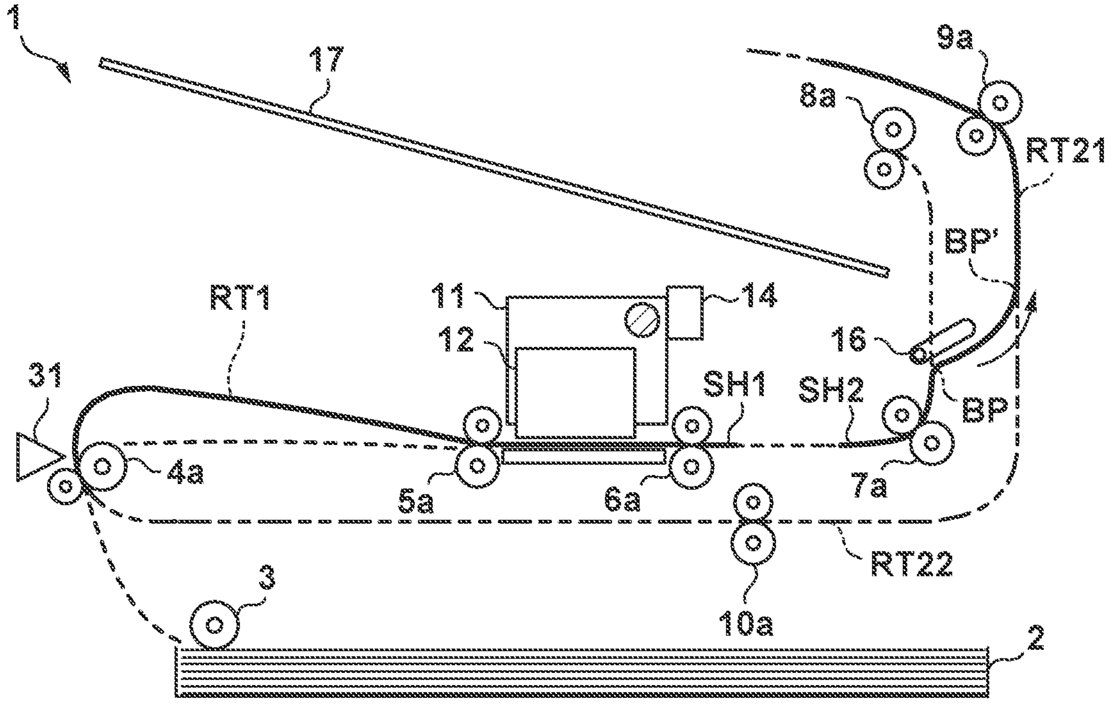

As shown in FIG. 10B, the trailing edge of the sheet SH2 can be separated from the sheet SH1 by the relative speed difference between the sheets SH1 and SH2. In this case, the speed of the conveyor roller 7*a* is controlled so that the reduction control can be completed before the trailing edge of the preceding sheet SH2 passes the conveyor roller 7*a*. Note that an example of this speed control will be described later.

Since the reduction control is executed during the printing control of the sheet SH1, the reduction control includes at least a control zone in which the conveyance of the succeeding sheet SH1 by the conveyor rollers 5*a* and 6*a* is stopped and the conveyor roller 7*a* conveys the preceding sheet SH2.

That is, the conveyance of the sheet SH1 is stopped during its printing operation. By continuously conveying the sheet SH2 during this printing operation, it is possible to maximize the relative speed difference between the sheets SH2 and SH1, and efficiently reduce the overlap amount. The overlap amount of the sheets SH2 and SH1 can be reduced at a lower conveyance velocity of the sheet SH2. If the reduction control is not completed during the printing operation of the sheet SH2, the reduction control is performed during the conveyance operation of the sheet SH2. In this case, the overlap amount can effectively be reduced because the speed of the conveyor roller 7*a* is higher than that of the conveyor roller 5*a*.

Figure 11A:
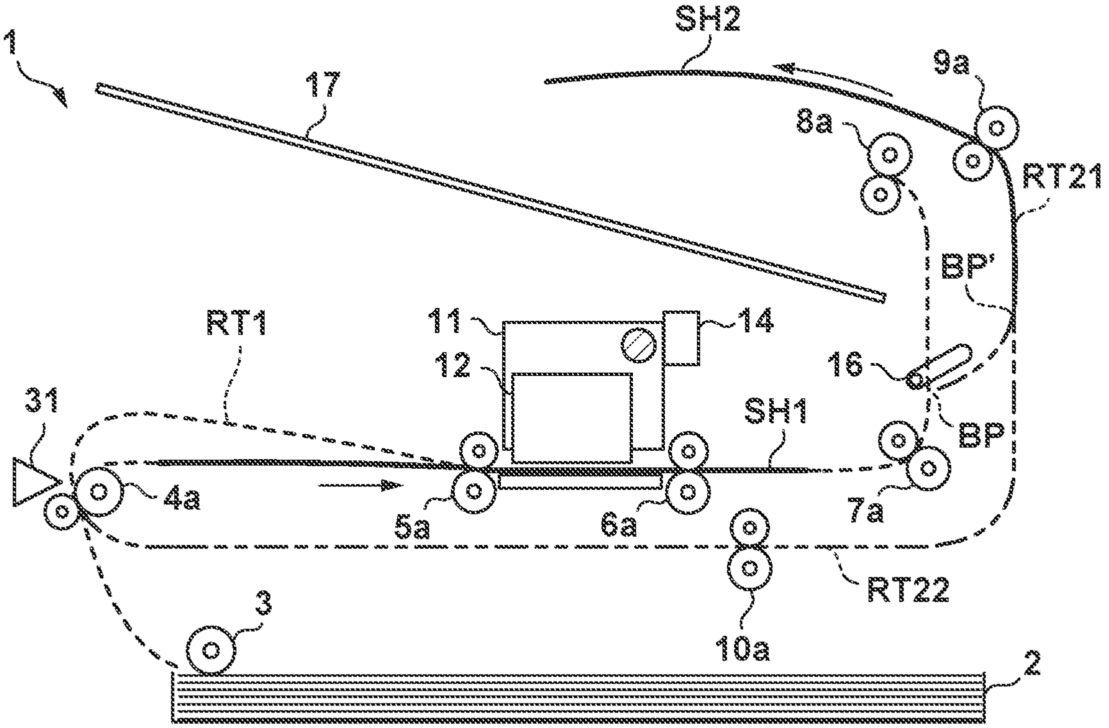
FIGS. 11A and 11B are views for explaining the operation of the printing apparatus shown in FIG. 1.

Referring to FIG. 11A, the conveyor roller 9*a* continuously conveys the sheet SH2 to a position where its trailing edge passes the branch point BP'. When the trailing edge of the sheet SH2 passes the flapper 16, the flapper 16 is pivoted in accordance with a post-printing process of the sheet SH1 that passes the flapper 16 next. Since the post-printing process of the sheet SH1 is discharge, the flapper 16 moves to a position where the conveyance route of the sheet SH1 is maintained in the main conveyance route RT1. Whether the trailing edge of the sheet SH2 has passed the flapper 16 can be determined from the rotation amounts of the various rollers or by installing another sensor.

Figure 11B:
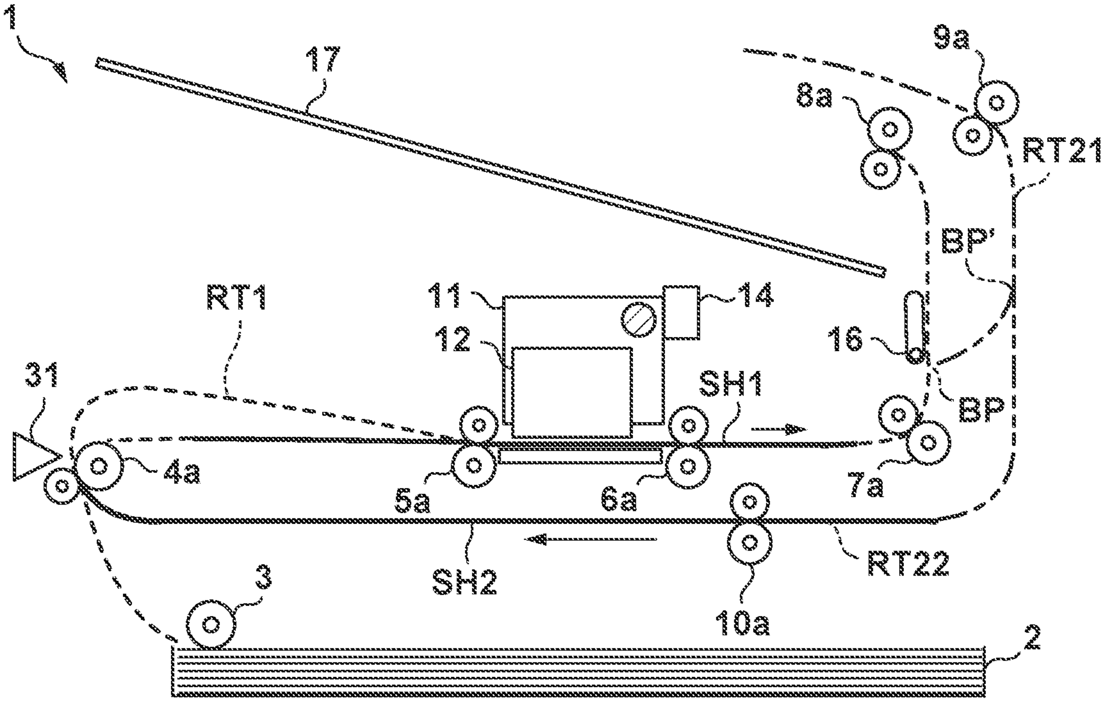

When the trailing edge of the sheet SH2 passes the branch point BP', the conveyor motor 26 is reversed to the direction R2 (see FIG. 1), and driving is switched to high-speed driving. The leading edge and trailing edge of the sheet SH2 are switched in this conveyance direction. The conveyor rollers 9*a* and 10*a* are rotated at, for example, 18 inches/sec. The sheet SH2 enters the return route RT22, and is conveyed to the feed roller 4*a* as shown in FIG. 11B.

When the conveyance of the sheet SH2 advances and the sensor 31 detects the leading edge of the sheet SH2, the conveyor motor 26 and the feed motor 23 are driven at low speed. Consequently, the conveyor roller 10*a* and the feed roller 4*a* are rotated at, for example, 7.6 inches/sec. Then, the conveyor roller 10*a* and the feed roller 4*a* convey the sheet SH2 from the return route RT22 to the main conveyance route RT1.

Figure 12A:
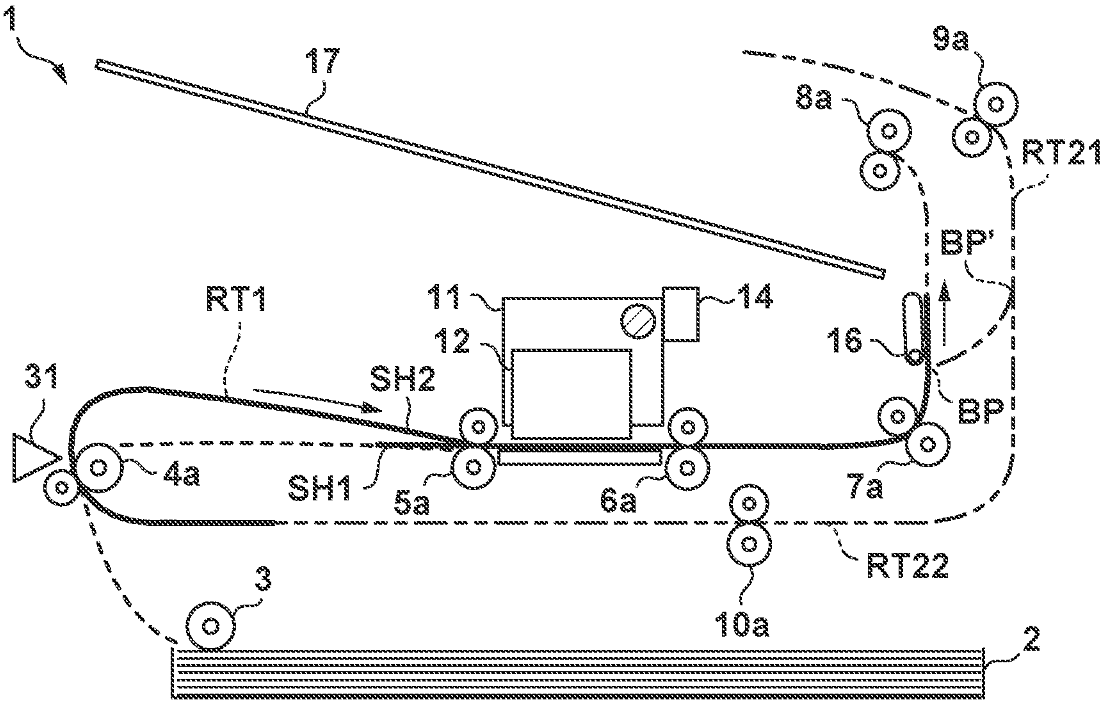
FIGS. 12A and 12B are views for explaining the operation of the printing apparatus shown in FIG. 1.

Subsequently, overlap state formation control is performed. Referring to FIG. 12A, the sheet SH1 is the preceding sheet and the sheet SH2 is the succeeding sheet again. Printing control is performed on the sheet SH1 based on the print data. When the sensor 31 detects the trailing edge of the sheet SH1, the conveyor motor 26 and the feed motor 23 are switched to high-speed driving. That is, the conveyor roller 10*a* and the feed roller 4*a* rotate at, for example, 20 inches/sec. An overlap state in which the leading edge of the sheet SH2 overlaps the trailing edge of the sheet SH1 is formed by rapidly moving the sheet SH2. Since the printing control is performed on the sheet SH1 based on the print data, the conveyor roller 5*a* intermittently conveys the sheet SH1. On the other hand, after the sensor 31 detects the trailing edge of the sheet SH2, the sheet SH2 can catch up with the sheet SH1 by continuously rotating the feed roller 4*a* at 20 inches/sec. After that, the sheet SH2 is conveyed until its leading edge arrives at a predetermined position slightly before the nip portion of the conveyance unit 5. The position of the leading edge of the sheet SH2 is calculated from the rotation amount of the feed roller 4*a* since the sensor 31 detects the leading edge of the sheet SH2, and is controlled based on the calculation result. The leading edge of the sheet SH1 passes the branch point BP and moves toward the conveyor roller 8*a*.

Then, a skew correcting operation of the sheet SH2 is performed. While the conveyor roller 5*a* is standing still in order to perform the printing operation on the sheet SH1, the leading edge of the sheet SH2 is abutted against the nip portion by driving the feed roller 4*a*. In this embodiment, the skew correcting operation of the sheet SH2 is performed while the conveyor roller 5*a* is standing still for an operation of printing the last line on the sheet SH1, in order to minimize the influence on the printing quality of the sheet SH1.

Figure 12B:
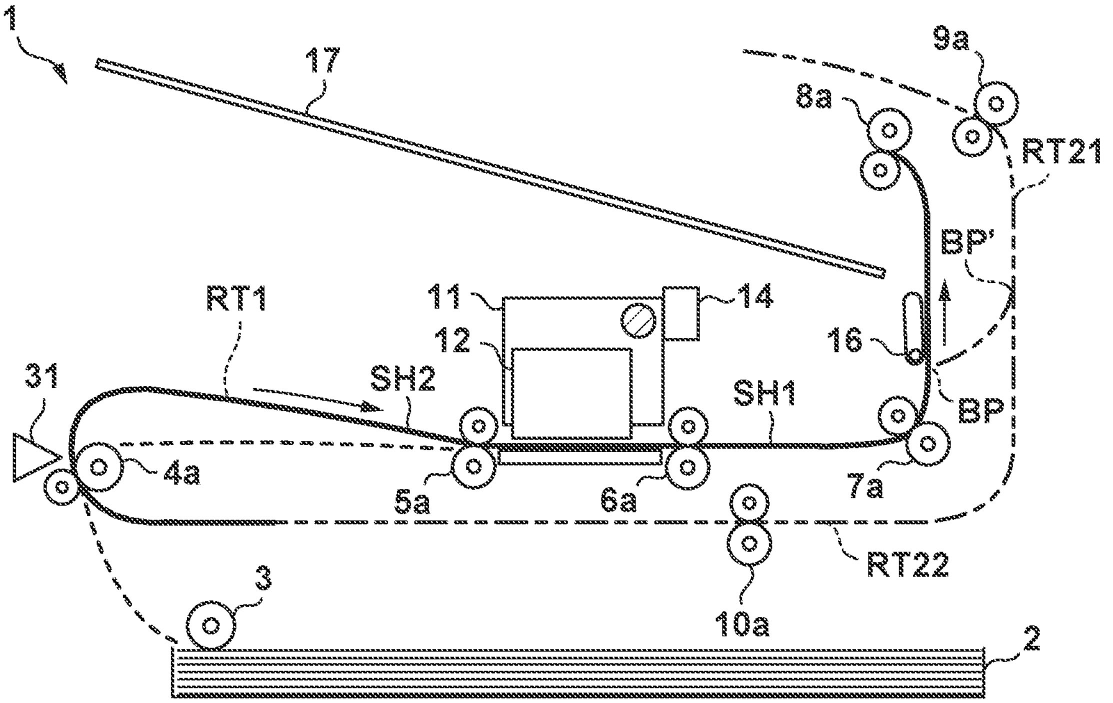

Referring to FIG. 12B, when the operation of printing the last line on the sheet SH1 is complete, the sheet SH2 can be aligned while maintaining the state in which the sheet SH2 overlaps the sheet SH1 by rotating the conveyor roller 5*a* by a predetermined amount. Note that the overlap portion of the sheets SH1 and SH2 is conveyed as it is nipped by the nip portion of the conveyance unit 5.

When the sheet SH2 is aligned, the feed motor 23 is switched to low-speed driving. That is, the feed roller 4*a* rotates at, for example, 7.6 inches/sec. When the conveyor roller 5*a* intermittently conveys the sheet SH2 by a predetermined amount each time, the feed motor 23 also intermittently drives the feed roller 4*a*. An operation of printing the print data of the third page on the obverse surface (upper surface) of the sheet SH2 is started by ejecting ink from the printhead 12 based on the print data. When the sheet SH2 is intermittently conveyed for this printing operation, the sheet SH1 is also intermittently conveyed.

Subsequently, overlap amount reduction control is performed. If the sheets SH1 and SH2 are discharged as they are largely overlapping each other, the stacking order of the sheets SH1 and SH2 on the discharge tray 25 may be inverted. Therefore, overlap amount reduction control is performed. In this embodiment, the overlap amount is reduced to 0. However, even when the overlap amount is not reduced to 0, a predetermined effect is obtained if the overlap amount can be reduced.

Figure 13A:
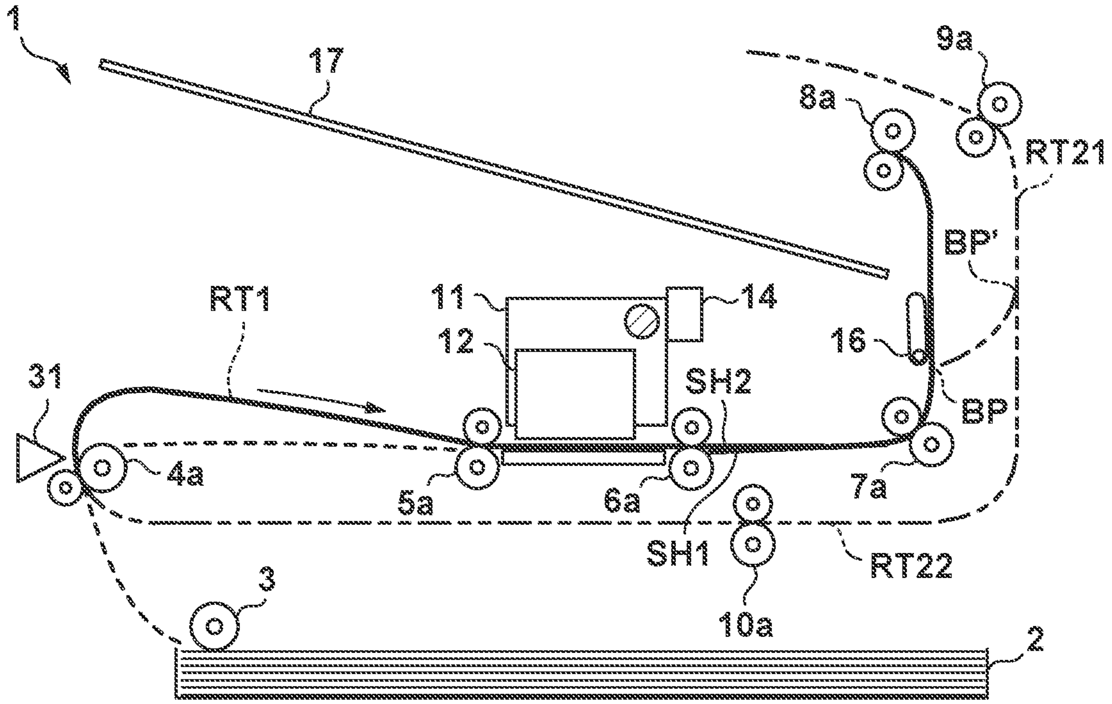
FIGS. 13A and 13B are views for explaining the operation of the printing apparatus shown in FIG. 1.

Referring to FIG. 13A, whether the trailing edge of the sheet SH1 has passed the conveyor roller 6*a* is determined from the rotation amount of the conveyor roller 5*a* since the start of the alignment operation on the sheet SH1, and from the length of the sheet SH1. As shown in FIG. 13A, at the timing at which the trailing edge of the sheet SH1 passes the conveyor roller 6*a*, the conveyor roller 7*a* can convey the preceding sheet SH1, and the conveyor rollers 5*a* and 6*a* can convey the succeeding sheet SH2. At this timing, the conveyor rollers 5*a* and 6*a* have no influence on the conveyance of the sheet SH1, and the conveyor roller 7*a* has no influence on the conveyance of the sheet SH2. Reduction control is started at this timing.

In this reduction control, the conveyor motor 25 continuously rotates the conveyor roller 7*a* independently of the conveyor rollers 5*a* and 6*a*. The conveyor roller 8*a* sharing the conveyor motor 25 also continuously rotates.

Figure 13B:
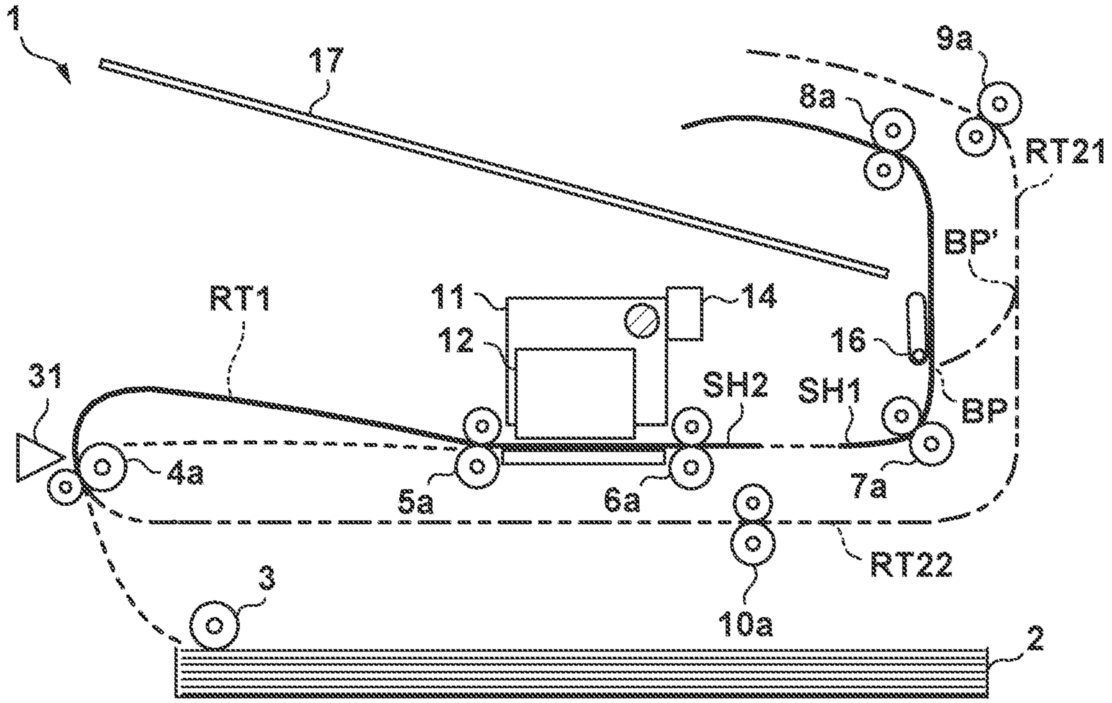

As shown in FIG. 13B, the trailing edge of the sheet SH1 can be separated from the sheet SH2 by the relative speed difference between the sheets SH1 and SH2. In this case, the speed of the conveyor roller 7*a* is controlled so that the reduction control can be completed before the trailing edge of the preceding sheet SH1 passes the conveyor roller 7*a*. Note that an example of this speed control will be described later.

The reduction control as described above can prevent the phenomenon that the sheets SH1 and SH2 are discharged as they are overlapping each other and as a consequence the stacking order of the sheets SH1 and SH2 on the discharge tray 17 is inverted. Since the reduction control is executed during printing control of the sheet SH2, the reduction control includes at least a control zone in which the conveyance of the succeeding sheet SH2 by the conveyor rollers 5*a* and 6*a* is stopped and the conveyor roller 7*a* conveys the preceding sheet SH1.

That is, the conveyance of the sheet SH2 is stopped during its printing operation. By continuously conveying the sheet SH1 during this printing operation, it is possible to maximize the relative speed difference between the sheets SH2 and SH1, and efficiently reduce the overlap amount. Accordingly, the speed of the conveyor roller 7*a* need not be higher than that of the conveyor roller 5*a* in order to reduce the overlap amount. The overlap amount of the sheets SH1 and SH2 can be reduced at a lower conveyance velocity of the sheet SH1. In other words, when the reduction control is performed during the printing operation, it is possible to reduce the conveyance velocity and suppress deterioration of the noise and electric power, compared to a case in which no reduction control is performed during the printing operation. In addition, if the reduction control is not completed during the printing operation of the sheet SH2, the reduction control is performed during the conveyance operation of the sheet SH2 as well. In this case, the overlap amount can effectively be reduced because the speed of the conveyor roller 7*a* is higher than that of the conveyor roller 5*a*.

Figure 14A:
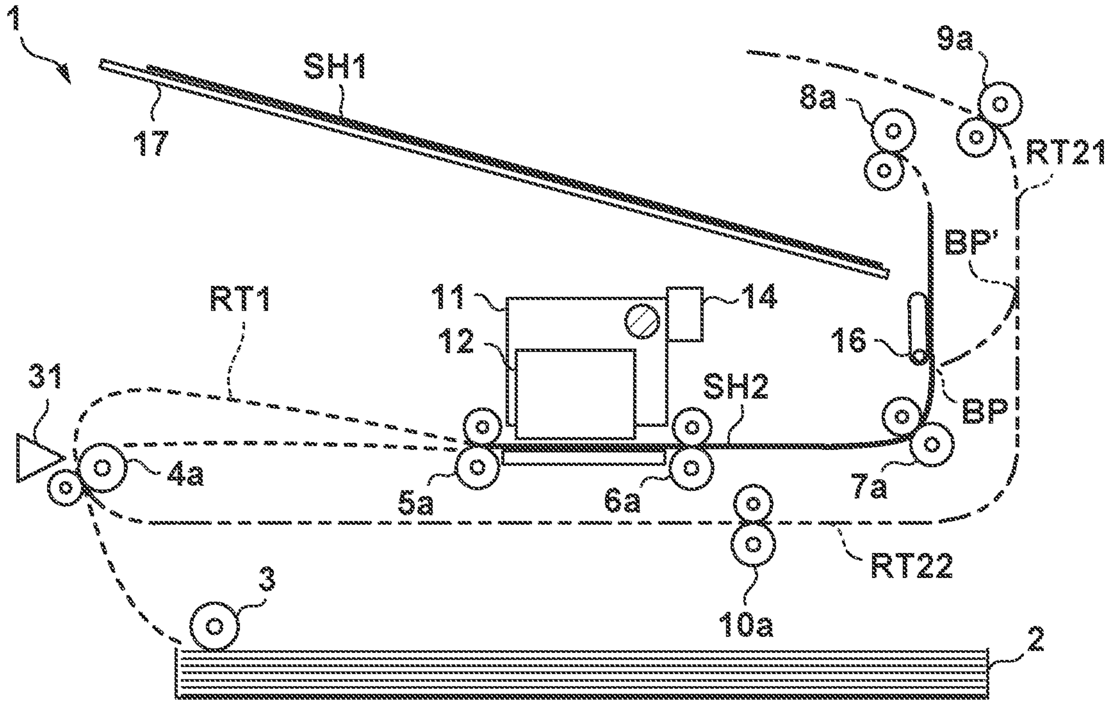
FIGS. 14A and 14B are views for explaining the operation of the printing apparatus shown in FIG. 1.
Figure 14B:
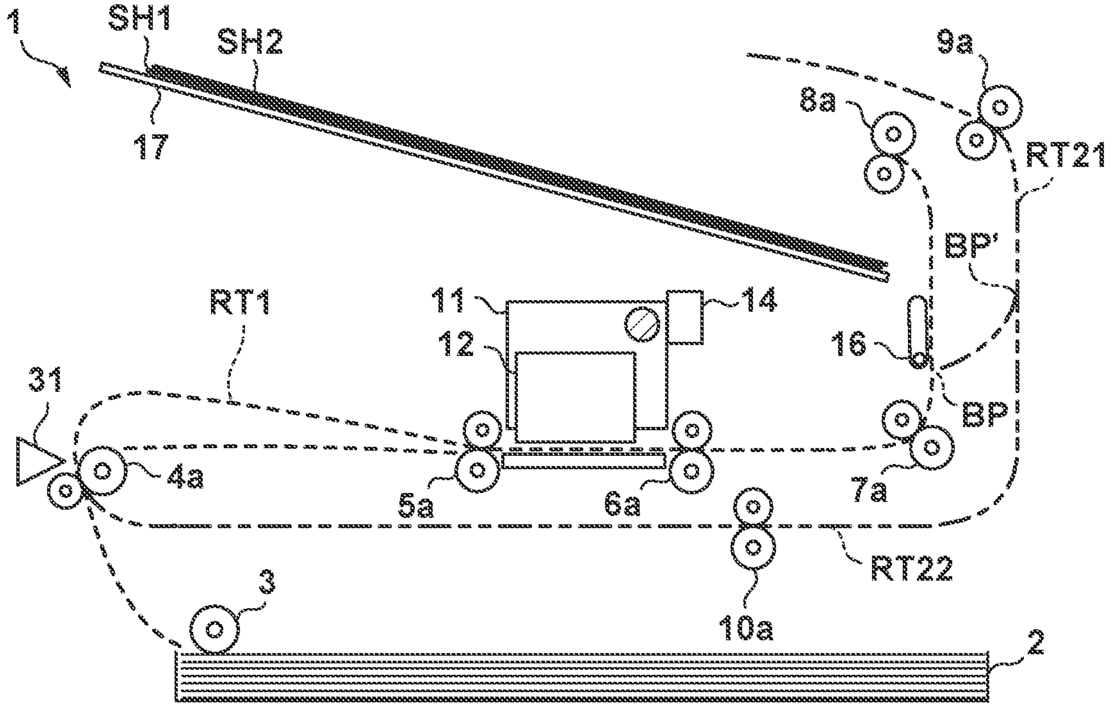

Referring to FIG. 14A, the sheet SH1 is discharged to the discharge tray 17 because printing on the two surfaces is complete. When printing of the last line of the sheet SH2 is completed, double-sided printing of the sheet SH2 as the last sheet of this job is also completed. The sheet SH2 is discharged to the discharge tray 17 as shown in FIG. 14B by rotating the conveyor rollers 8*a*, 7*a*, 6*a*, and 5*a* in the same direction.

The operation of double-sided printing based on the printing conditions shown in FIG. 3A is complete as described above. The same operation is performed in the case of single-sided printing based on the printing conditions shown in FIG. 3B, except for the operation of supplying the sheet SH to the sub-conveyance route RT2. That is, overlap state formation control and overlap amount reduction control are sequentially performed between successive sheets.

<Control Process Example>

A processing example of the MPU 41 for implementing the operation of the printing apparatus 1 described above will be explained with reference to FIG. 15. In step S1, the printing order N is initialized to 1. In step S2, a maximum printing order Nmax is acquired from the printing conditions. Nmax is a maximum value of the printing order N, and is 4 in the example shown in FIG. 3A and 3 in the example shown in FIG. 3B.

In step S3, the position of the flapper 16 is controlled so as to correspond to processing G(N) corresponding to printing order N=1. Processing G(1) after printing is inversion in the example shown in FIG. 3A, so the flapper 16 is moved to the position shown in FIG. 4B. Processing G(1) after printing is discharge in the example shown in FIG. 3B, so the flapper 16 is moved to the position shown in FIG. 1.

In step S4, feeding of an M(N)th sheet SH from a feed source Q(N) is started. If the feed source Q(N) is the feed tray 2, the feed motor 22 is initially driven at low speed. Consequently, the pickup roller 3 is rotated at, for example, 7.6 inches/sec. When the pickup roller 3 rotates, the uppermost one of the sheets SH stacked in the feed tray 2 is picked up. The sheet SH picked up by the pickup roller 3 is conveyed by the feed roller 4*a* rotating in the same direction as the pickup roller 3. The feed motor 23 drives the feed roller 4*a* at the same speed as that of the pickup roller 3. The pickup roller 3 rotates by a predetermined amount with which the sheet SH can be conveyed to a position exceeding the feed roller 4*a*, and then stops so as not to pick up the next conveyance medium. The pickup roller 3 is a one-way roller, so the conveyance by the feed roller 4*a* can be continued even when the pickup roller 3 is stopped.

If the feed source Q(N) is the sub-conveyance route RT2, the conveyor motor 26 is driven at low speed, and the feed motor 23 is also driven at low speed. Consequently, the conveyor roller 10*a* and the feed roller 4*a* are rotated at, for example, 7.6 inches/sec. Then, the conveyor roller 10*a* and the feed roller 4*a* convey the sheet SH in the direction of the conveyor roller 5*a* through the return route RT22 and the main conveyance route RT1.

In step S5, whether the sensor 31 has detected the leading edge of the M(N)th sheet SH (whether the leading edge has passed the sensor 31) is determined. If it is determined that the leading edge has passed, step S6 is executed. In step S6, the feed speed of the M(N)th sheet SH is switched to a high speed (for example, 20 inches/sec). Since the feed motor 23 is switched to high-speed driving, the feed roller 4*a* rotates at 20 inches/sec. If a preceding M(N−1)th sheet SH exists, an operation of allowing the succeeding sheet SH to catch up with the preceding sheet SH is started.

In step S7, whether N=1 is determined. If it is determined that N=1, there is no preceding sheet SH as an overlap target, so the process advances to step S9. On the other hand, if it is determined that N+1, there is the possibility that it is necessary to convey the preceding sheet SH and the succeeding sheet SH by overlapping them, so overlap state formation control is executed in step S8.

Figure 16:
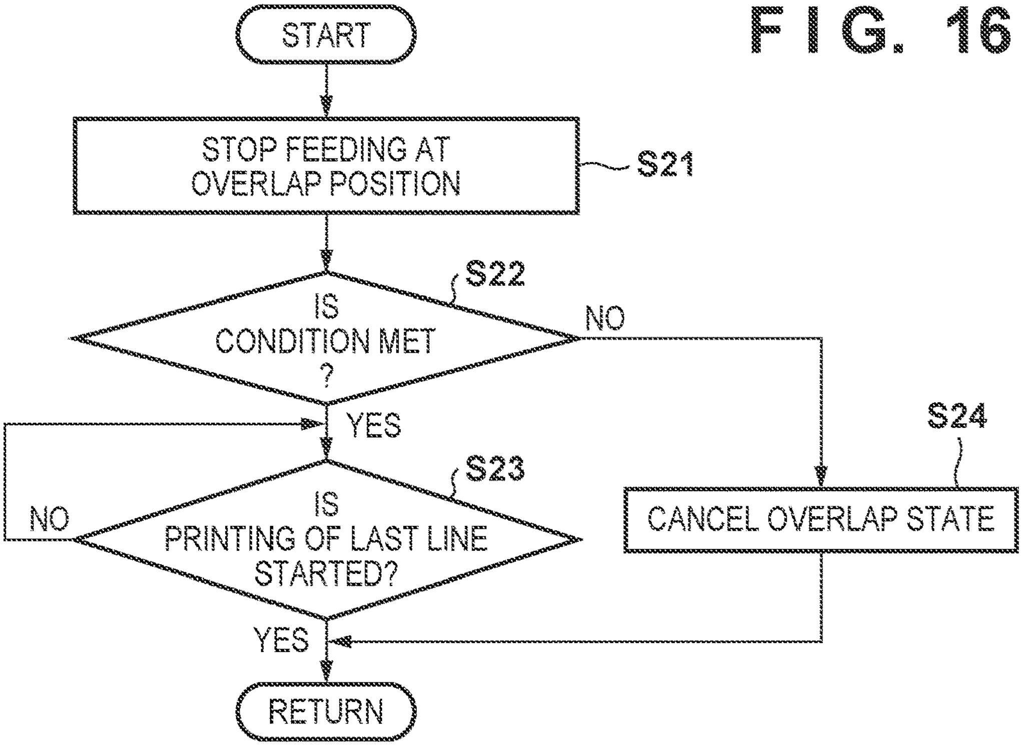
FIG. 16 is a flowchart showing a processing example of the control unit shown in FIG. 2.

FIG. 16 is a flowchart of the overlap state formation control. In step S21, the conveyance of the sheet SH is stopped so that the leading edge of the M(N)th sheet SH is positioned in a predetermined position before the conveyor roller 5*a*. In a case where the trailing edge of the preceding sheet SH is positioned on the upstream side of the conveyor roller 5*a*, an overlap state in which the leading edge of the succeeding sheet SH overlaps the trailing edge of the preceding sheet SH is formed. The position of the leading edge of the M(N)th sheet SH is calculated from the rotation amount of the feed roller 4*a* since the leading edge of the M(N)th sheet SH is detected by the sensor 31, and is controlled based on the calculation result.

In step S22, whether a predetermined overlap execution condition is met is determined. The overlap execution condition is the determination of whether it is possible to overlap the trailing edge of the preceding sheet SH and the leading edge of the succeeding sheet SH and convey them. For example, the determination is NO if the preceding sheet SH has already passed the conveyor roller 5*a*. The determination is NO if the overlap amount is smaller than the predetermined amount. Also, if, for example, the overlap amount is larger than the conveyance distance between the conveyor rollers 6a and 7a, the determination is NO because it becomes difficult to separate the sheets in reduction control (to be described later). Furthermore, if, for example, the reduction control (to be described later) is executed by setting a target distance as the separation distance between the sheets, and if the overlap amount exceeds this target separation distance, the determination is NO.

Figure 15:
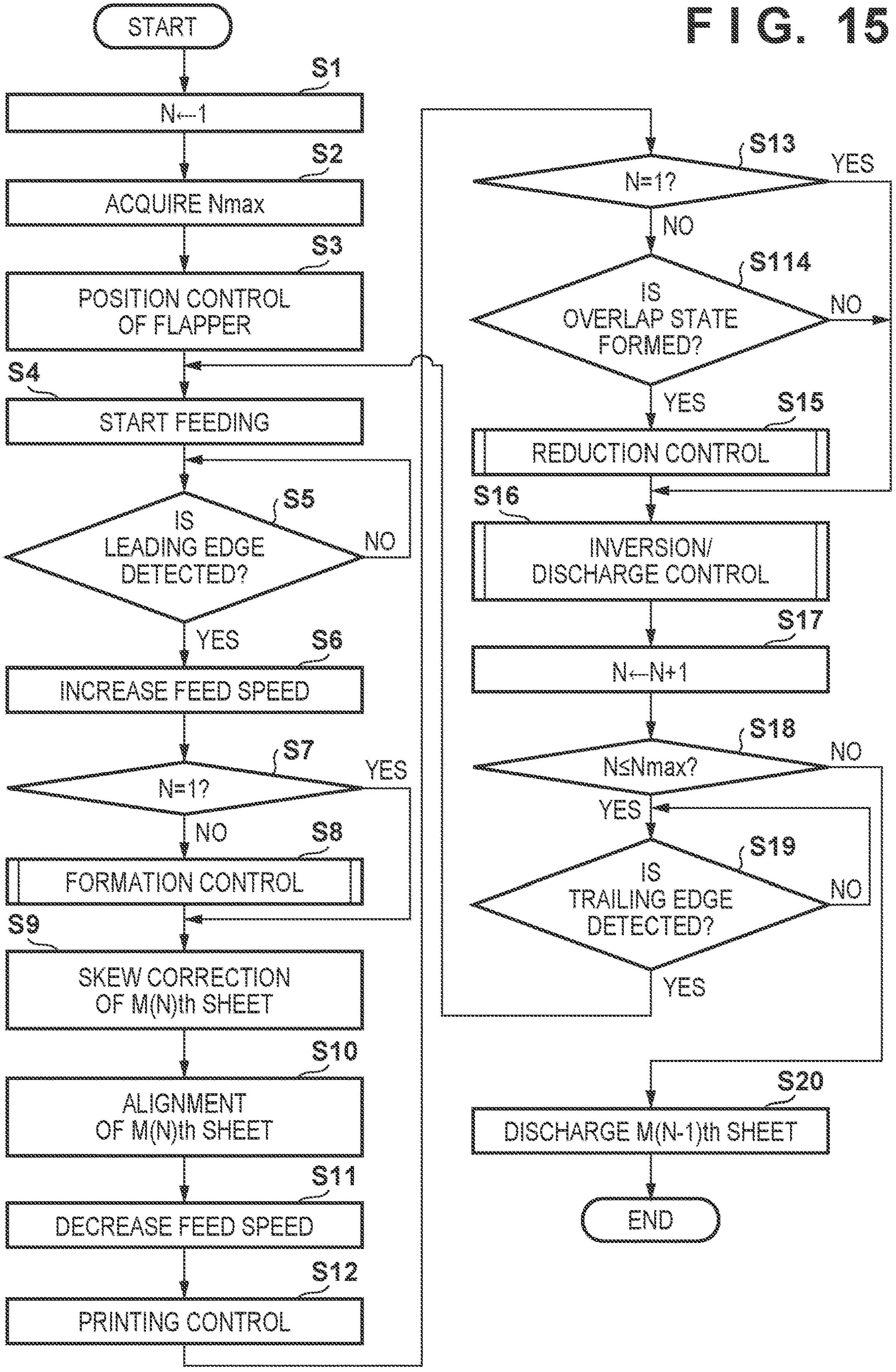
FIG. 15 is a flowchart showing a processing example of the control unit shown in FIG. 2.

If it is determined that the overlap execution condition is met, step S23 is executed. In step S23, it is determined whether an operation of printing the last line of the M(N−1)th preceding sheet SH is started. If it is determined that the operation is not started (step S23: NO), the process waits for the start of the printing operation. If it is determined that the operation is started (step S23: YES), the processing (skew correction) in step S9 of FIG. 15 is executed.

If it is determined in step S22 that the overlap execution condition is not met, a process of canceling the overlap state is performed in step S24. In step S24, a process of pausing the conveyance of the M(N)th succeeding sheet SH until the M(N−1)th preceding sheet SH passes the conveyor roller 5a. After that, the processing (skew correction) in step S9 of FIG. 15 is executed.

Referring to FIG. 15 again, skew correction of the M(N)th sheet SH is performed in step S9. While the conveyor roller 5a is standing still, the leading edge of the M(N)th sheet SH is abutted against the nip portion of the conveyance unit 5 by driving the feed roller 4a, thereby performing the skew correcting operation on the M(N)th sheet SH. Note that if it is determined in step S7 that N=1, or if it is determined in step S22 that the overlap execution condition is not met, skew correction is performed on the M(N)th sheet SH without overlapping this sheet on the preceding sheet SH. On the other hand, if it is determined in step S22 that the overlap execution condition is met, skew correction is performed on the M(N)th sheet SH by overlapping this sheet on the M(N−1)th preceding sheet SH.

In step S10, alignment of the M(N)th sheet SH is performed. Alignment of the M(N)th sheet SH can be performed by rotating the conveyor roller 5a by a predetermined amount. In this case, if skew correction is performed on the M(N)th sheet SH in step S9 by overlapping this sheet on the M(N−1)th sheet SH, alignment is performed by maintaining the overlap state.

In step S11, the feed speed of the M(N)th sheet SH is switched to low speed (for example, 7.6 inches/sec). By switching the feed motor 23 to low-speed driving, the feed roller 4a rotates at 7.6 inches/sec.

In step S12, an operation of printing the data of a page having a page number K (N) is started on a printing surface F(N) of the M(N)th sheet SH. When the conveyor roller 5a intermittently conveys the sheet SH by a predetermined amount each time, the feed motor 23 also intermittently drives the feed roller 4a. When the M(N)th sheet SH is intermittently conveyed for the printing operation, the M(N−1)th sheet SH is also intermittently conveyed.

In step S13, whether N=1 is determined. If it is determined that N=1, step S16 is executed. If it is determined that N+1, step S14 is executed. In step S14, whether an overlap state is formed between the M(N)th sheet SH and the M(N−1)th sheet SH is determined. If it is determined that the overlap state is formed, reduction control in step S15 is executed. Details of the reduction control will be described later.

Figure 20:
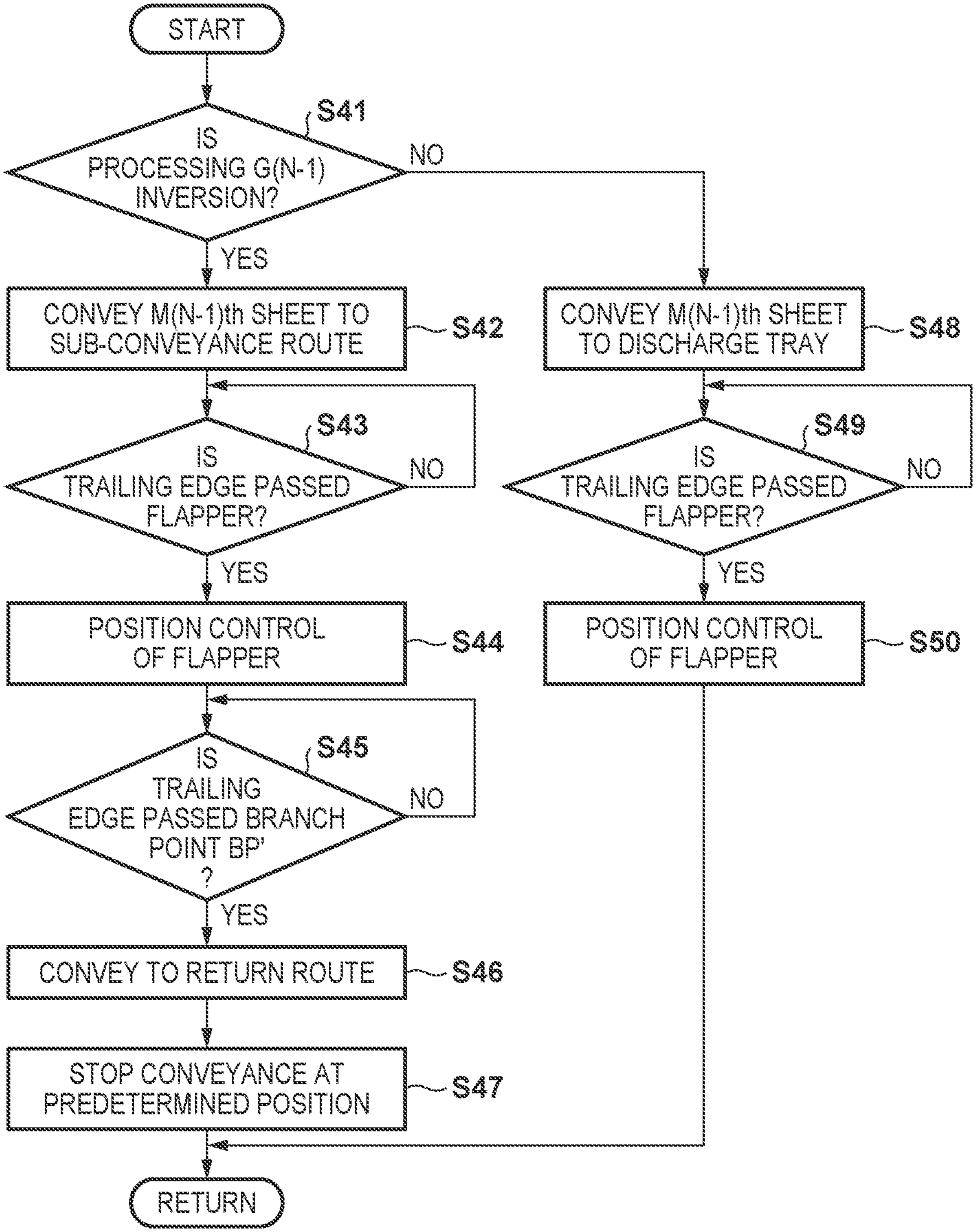
FIG. 20 is a flowchart showing a processing example of the control unit shown in FIG. 2.

In step S16, inversion/discharge control is executed. FIG. 20 is a flowchart showing a processing example. In step S41, whether processing G(N−1) after printing is inversion is determined. If it is determined that the processing is inversion, step S42 is executed, that is, the M(N−1)th sheet SH is conveyed to the sub-conveyance route RT2 by rotating the conveyor roller 7a. In this step, the position of the flapper 16 is already moved by another processing to a position for guiding the sheet SH to the sub-conveyance route RT2.

In step S43, whether the trailing edge of the M(N−1)th sheet SH has passed the flapper 16 is determined. This determination on whether the trailing edge has passed the flapper 16 can be performed from the rotation amounts of the various rollers, and can also be performed by installing another sensor. If it is determined that the trailing edge has passed the flapper 16, step S44 is executed. In step S44, the flapper 16 is so moved as to correspond to processing G(N) after printing is performed on the succeeding sheet SH.

In step S45, whether the trailing edge of the M(N−1)th sheet SH has passed the branch point BP' is determined. If it is determined that the trailing edge has passed, step S46 is executed. In step S46, the M(N−1)th sheet SH is conveyed to the return route RT22. By switching the conveyor motor 26 to high-speed driving for reverse rotation (the direction R2 in FIG. 1), the conveyor rollers 9a and 10a are rotated at, for example, 18 inches/sec. When the conveyance directions are thus switched, the leading edge and trailing edge of the M(N−1)th sheet SH are switched. After that, in step S47, the M(N−1)th sheet SH is stopped when the leading edge of the sheet SH arrives at a predetermined position before the main conveyance route RT1. The position in this step is also calculated from the rotation amount of each roller since the start of alignment, and from the length of the sheet. After that, step S17 in FIG. 15 is executed.

If it is determined in step S41 that the processing G(N−1) after printing is not inversion, step S48 is executed, that is, the M(N−1)th sheet SH is discharged to the discharge tray 17 by rotating the conveyor rollers 8a and 7a. In step S49, whether the trailing edge of the M(N−1)th sheet SH has passed the flapper 16 is determined. If it is determined that the trailing edge has passed the flapper 16, step S50 is executed. In step S50, the flapper 16 is so moved as to correspond to processing G(N) after printing is performed on the succeeding sheet SH.

Referring to FIG. 15 again, 1 is added to the printing order in step S17. In step S18, whether the printing order N after the addition is equal to or larger than the maximum printing order Nmax is determined. If it is determined that the printing order N is equal to or smaller than the maximum printing order Nmax, step S19 is executed. In step S19, whether the trailing edge of the M(N−1)th sheet SH has passed the sensor 31 is determined. If it is determined that the trailing edge has passed the sensor 31, the process returns to step S4 to start the feed operation, and control is executed by the same flow as described above.

If it is determined in step S18 that the printing order N is not equal to or smaller than the maximum printing order Nmax, it is determined that the printing is complete, and step S20 is executed. In step S20, the M(N−1)th sheet SH is discharged. The sheet SH can be discharged to the discharge tray 17 by rotating the conveyor rollers 8a, 7a, 6a, and 5a in the same direction. The process is completed as described above.

<Reduction Control>

Figure 17:
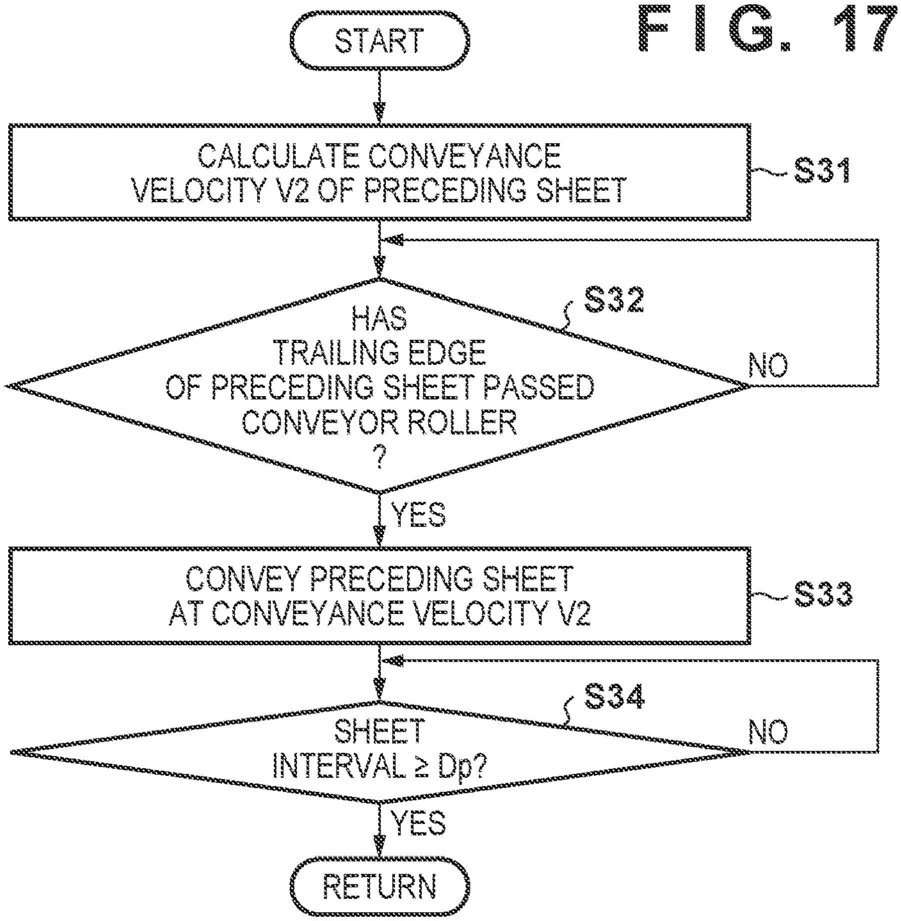
FIG. 17 is a flowchart showing a processing example of the control unit shown in FIG. 2.

FIG. 17 is a flowchart showing a processing example of the reduction control in step S15. FIGS. 18A to 19C are views for explaining the reduction control.

Figure 18A:
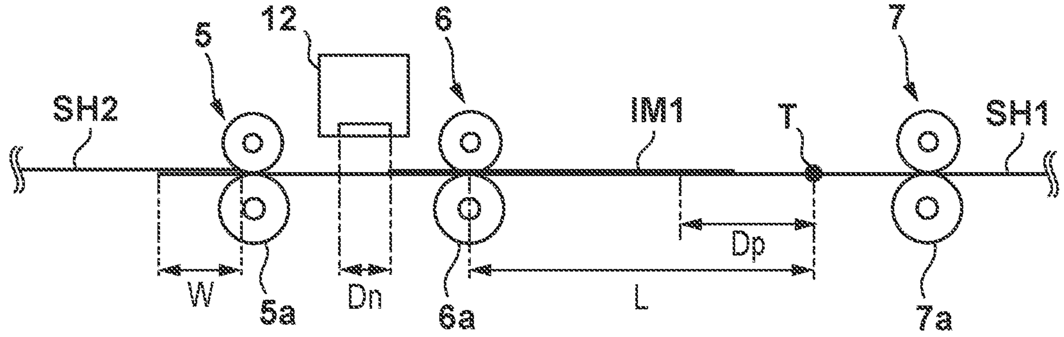
FIGS. 18A to 18C are views for explaining reduction control.

Referring to FIG. 18A, the reduction control uses at least two conveyance units. This embodiment uses the conveyance units 6 and 7. The conveyance unit 6 is positioned on the upstream side of the conveyance unit 7 in the conveyance direction of the sheet SH. A case in which the overlap amount of the preceding sheet SH1 and the succeeding sheet SH2 is reduced will be explained below.

FIG. 18A shows a state in which skew correction of the succeeding sheet SH2 is performed. While the conveyor roller 5*a* is standing still in order to perform an operation of printing the last line of the sheet SH1, the skew correcting operation of the sheet SH2 is performed by abutting the leading edge of the sheet SH2 against the nip portion of the conveyance unit 5. In this state, the trailing edge of the sheet SH1 and the leading edge of the sheet SH2 overlap each other by an overlap amount W in the conveyance direction. The reduction control is based on the assumption that the overlap amount W is smaller than the distance between the conveyor rollers 6*a* and 7*a*.

Note that in FIG. 18A, Dn is the distance of the nozzle region of the printhead 12, and is the distance from the most upstream side to the most downstream side of ejection nozzles of the printhead 12, that is, a maximum printing width in the conveyance direction. Accordingly, letting Ds be the printing width in one printing operation, $Ds \leq Dn$ holds. The printing width Ds can change from one printing operation to another. IM1 indicates an image printed on the sheet SH1.

Figure 18B:
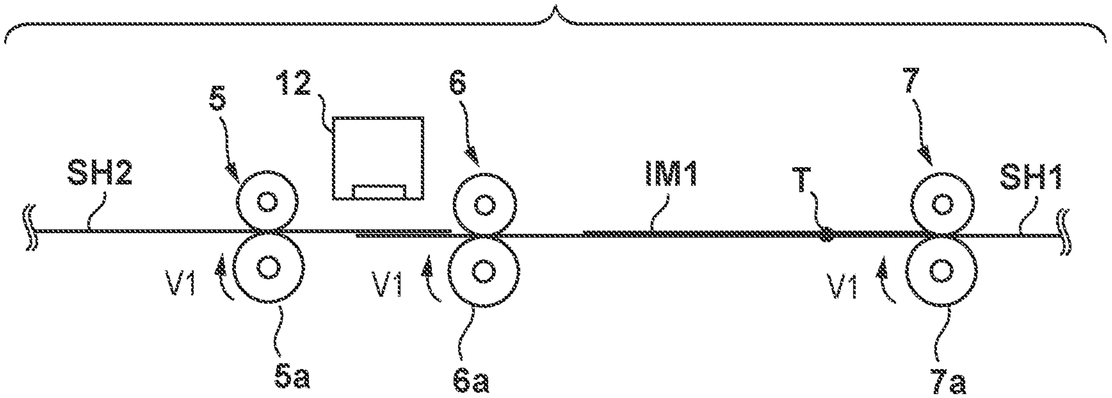

When the operation of printing the last line on the sheet SH1 is complete, the sheet SH2 can be aligned while maintaining a state in which the sheet SH2 overlaps the sheet SH1 by the overlap amount W by rotating the conveyor roller 5*a* by a predetermined amount. FIG. 18B shows a state in which this alignment is performed, that is, the most downstream end of a prospective printing region of the sheet SH2 matches the position of an ejection nozzle on the most downstream side of the ejection nozzles of the printhead 12. V1 indicates the velocity during intermittent conveyance of the sheets SH1 and SH2.

Figure 18C:
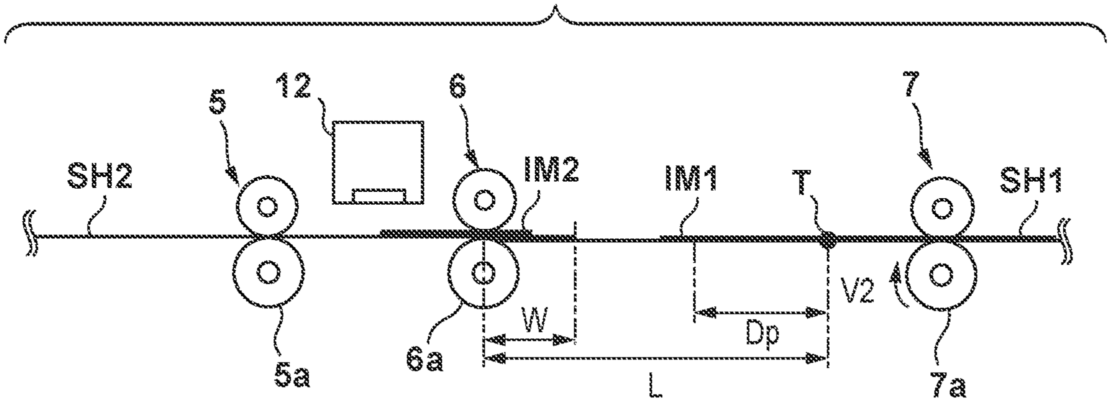

Referring to FIG. 18C, the reduction control is started after the trailing edge of the preceding sheet SH1 has passed the conveyor roller 6*a* on the upstream side to be used in the reduction control. Note that the start timing is not limited to "immediately after passage" and need only be "after passage". IM2 indicates an image printed on the sheet SH2.

The reduction control is so executed as to be terminated before the trailing edge of the preceding sheet SH1 passes a given position T. In this example shown in FIG. 18C, the position Tis set before the conveyor roller 7*a*. However, the position T can also be matched with the conveyor roller 7*a*. In other words, the reduction control is so executed as to be terminated before the trailing edge of the preceding sheet SH1 passes the conveyor roller 7*a*. Also, in accordance with the setting of the position T, the reduction control is so executed as to be terminated before the leading edge of the succeeding sheet SH2 arrives at the conveyor roller 7*a*.

The region from the conveyor roller 6*a* to the position Tis a separation region, and the length of the region is L. In addition, Dp is the interval between the trailing edge of the preceding sheet SH1 and the leading edge of the succeeding sheet SH2 after the reduction control. In this case, the distance of $(L-W-Dp)$ is a scan determination distance, and is referred to by calculating a scan count S when performing printing on the succeeding sheet SH2. The scan count can also be regarded as the number of times of movement of the carriage 11.

Referring to a flowchart shown in FIG. 17, in step S31, a conveyance velocity V2 of the preceding sheet SH1 is calculated. In this step, the MPU 41 acquires the overlap amount W. Also, the scan count S when the leading edge of the succeeding sheet SH2 advances the scan determination distance $(L-W-Dp)$ is calculated from print data to be printed on the succeeding sheet SH2. In addition, a separation time Tmax is calculated.

$Tmax=(L-W-Dp)/V1+S\cdot Ts$ can be calculated from the overlap amount W, the scan count S, a one-scan required time Ts, the length L of the separation region, the sheet interval Dp after reduction control, and the conveyance velocity V1 of the succeeding sheet SH2.

In this embodiment, the conveyance velocity V1 of the succeeding sheet SH2 is the conveyance velocity of the conveyor roller 6*a*. Note that the one-scan required time Ts is a t2-t3 time or a t4-t5 time shown in FIG. 19C. The t4-t5 time includes the waiting times before and after printing. If the required time Ts changes from one printing operation to another, the average value of the different times can be used.

The velocity V2 of the sheet SH1 is calculated from the separation time Tmax and the length L of the separation region, and is $V2=L/Tmax$.

In step S32, whether the trailing edge of the preceding sheet SH1 has passed the conveyor roller 6*a* is determined. In this embodiment, whether the trailing edge has passed the conveyor roller 6*a* is determined. If it is determined that the trailing edge has passed the conveyor roller 6*a*, the process advances to step S33.

Figure 19A:
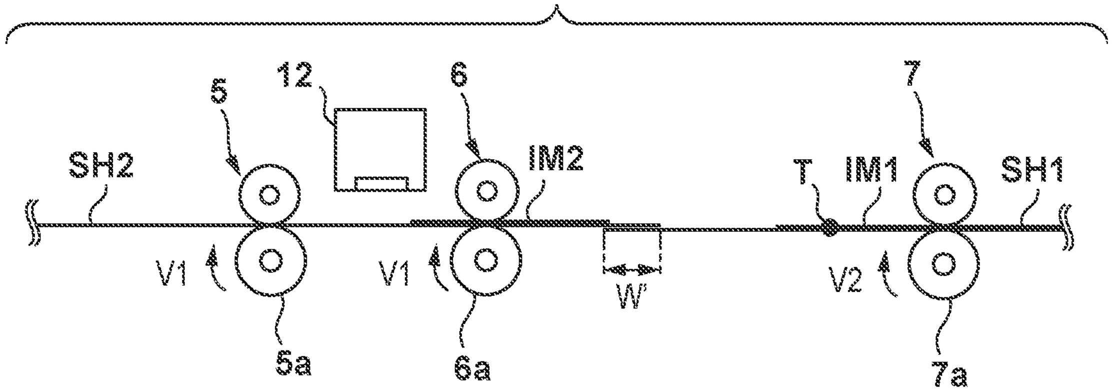
FIGS. 19A to 19C are views for explaining the reduction control.

In step S33, the conveyance roller 7*a* to be used in separation on the downstream side in the conveyance direction is rotated at a velocity higher than V2. FIG. 18C shows a state in which the conveyor roller 7*a* starts rotating at a velocity higher than V2. By this operation, as shown in FIG. 19A, the preceding sheet SH1 is separated from the succeeding sheet SH2, so the overlap amount W reduces to W'. The conveyor rollers 5*a* and 6*a* are standing still in FIG. 18C, and are rotating at the velocity V1 in FIG. 19A.

Figure 19B:
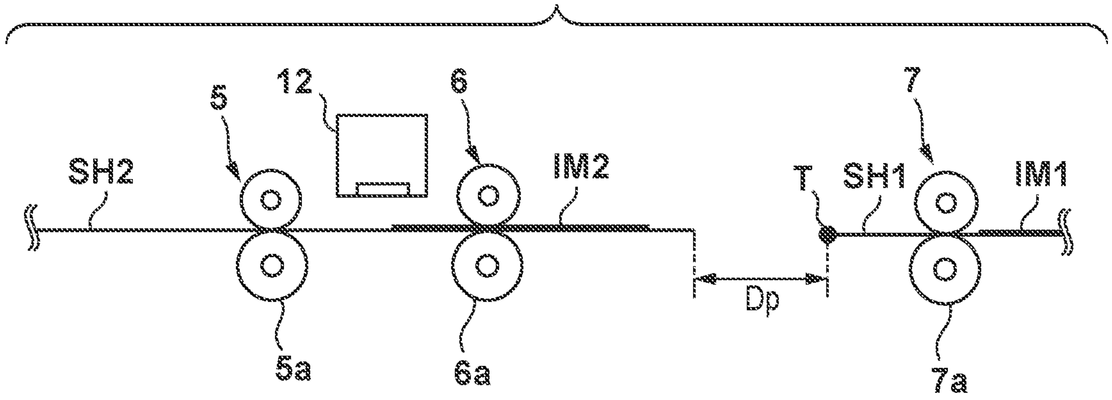

As shown in FIG. 19B, a sheet interval larger than the interval Dp can be obtained until the trailing edge of the sheet SH1 passes the position T, so the overlap state can be canceled.

In step S34, whether the interval between the trailing edge of the preceding sheet SH1 and the leading edge of the succeeding sheet SH2 is equal to or larger than Dp is determined. If it is determined that the interval is equal to or larger than Dp, the reduction control is terminated.

Figure 19C:
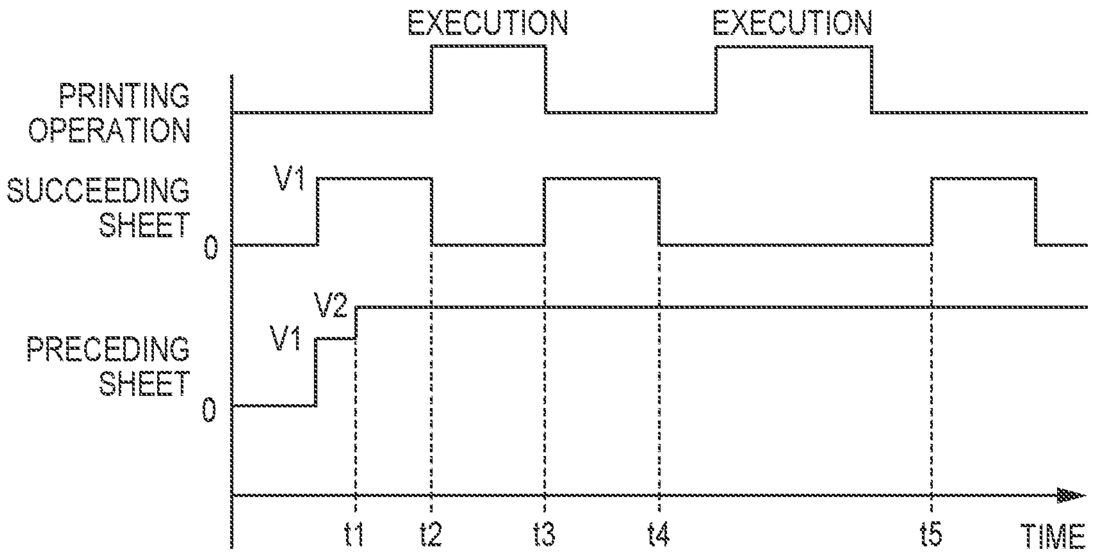

FIG. 19C shows changes in the printing operation and conveyance velocity of the succeeding sheet SH2 and the conveyance velocity of the preceding sheet SH1 after the reduction control is started. The reduction control is started at time t1, and the preceding sheet SH1 is conveyed at the velocity V2 (>V1) by continuous rotation of the conveyor roller 7*a*. Intermittent conveyance is performed on the succeeding sheet SH2, so the conveyance stops while the printing operation is executed. The relative velocity difference between the preceding sheet SH1 and the succeeding sheet SH2 is maximized during the time t2-t3 or the time t4-t5, so the reduction of the overlap amount is accelerated. The overlap amount of the preceding sheet SH1 and the succeeding sheet SH2 can be reduced at a lower conveyance velocity of the preceding sheet SH1. In addition, there is no influence such as a delay of the printing control on the succeeding sheet SH2 during the reduction control.

The interval Dp is $Dp \geq 0$ in this embodiment, and the overlap state can be canceled by $Dp \geq 0$. However, the interval Dp can also be $Dp<0$. In this case, the overlap state is not completely canceled, but the overlap amount can be reduced. Dp can also be set by experimentally obtaining an overlap amount with which no paper jam occurs at the branch point BP, or an overlap amount with which the stacking order of a plurality of sheets SH does not change on the discharge tray 17.

Note that a separation time Tmax' when no reduction control is performed during the printing operation is Tmax'=(L−W−Dp)/V1. In this case, therefore, a velocity V2' of the preceding sheet SH1 during the reduction control is $$V2' = L/T\max'$$

Since Tmax>Tmax', V2<V2' holds. That is, by performing the reduction control during the printing operation in which the conveyance of the succeeding sheet SH2 is stopped, it is possible to reduce the conveyance velocity and suppress deterioration of the noise and electric power, compared to a case where no reduction control is performed during the printing operation.

When the time S·Ts required for S-time scan operations is large, V2 can be reduced. It is also possible to prepare a waiting time irrelevant to the scan operation. In this case, it is possible to further reduce the conveyance velocity and suppress deterioration of the noise and electric power. Note that V2 during the reduction control can be higher than V1. Since, however, there is a conveyance stop period is provided for the succeeding sheet SH2, V2 need not be higher than V1 and can also be equal to or lower than V1 depending on the calculation result of V2. The conveyor roller 7*a* for continuously conveying the preceding sheet SH1 need not be continuously driven at a constant velocity higher than V2. That is, control can also be performed such that the average velocity including stoppage, acceleration, and deceleration is higher than V2.

When determining termination of the reduction control (step S34), another termination condition can also be set. For example, termination can be determined if the trailing edge of the preceding sheet SH1 arrives at the conveyor roller 7*a*. In this case, if the reduction control is performed at a velocity higher than V2, the sheet interval can further be increased.

Second Embodiment

In the first embodiment, the conveyor rollers 6*a* and 7*a* are used in reduction control. However, rollers to be selected and used in reduction control are not limited to them. For example, rollers to be used in reduction control can also be the conveyor rollers 6*a* and 8*a*, although this use is limited to the conveyance of the sheet SH in the main conveyance route RT1.

Since the conveyor rollers 7*a* and 8*a* are driven by the same conveyor motor 25, reduction control must be completed before the leading edge of the succeeding sheet SH arrives at the conveyor roller 7*a*. The position T shown in FIG. 18A is set in a position advanced to the downstream side in the conveyance direction by Dp from the conveyor roller 7*a*. The length L of the separation region is the distance from the conveyor roller 6*a* to the position T advanced to the downstream side in the conveyance direction by Dp from the conveyor roller 7*a*.

Figure 21A:
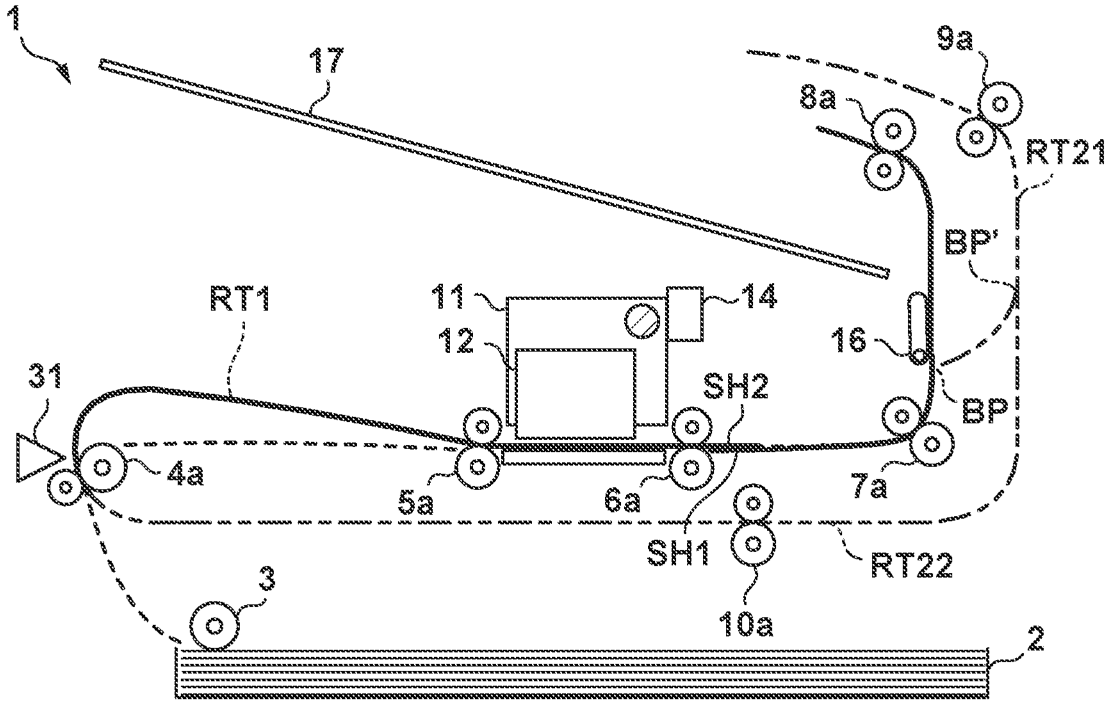
FIGS. 21A and 21B are views for explaining the operation of the printing apparatus, and show an example of another reduction control.
Figure 21B:
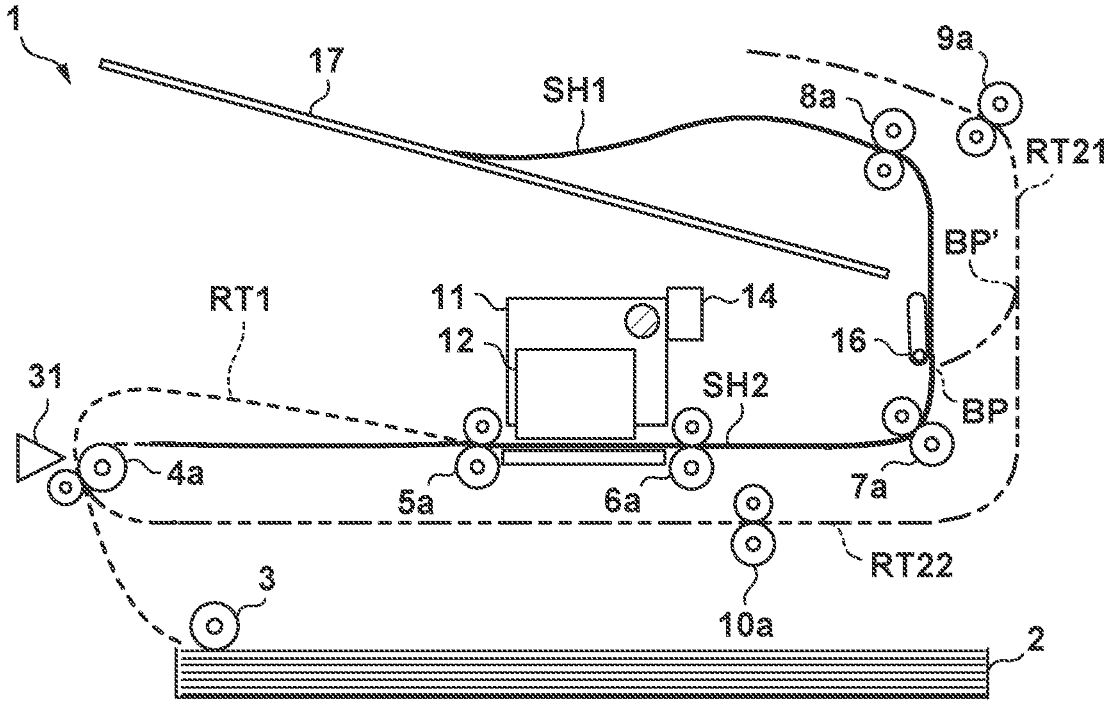

FIG. 21A shows an example of the start timing of reduction control. The trailing edge of the preceding sheet SH1 has passed the conveyor roller 6*a*. The conveyor motor 25 rotates the conveyor rollers 8*a* and 7*a* at the velocity V2. FIG. 21B shows the timing at which the reduction control is terminated. As shown in FIG. 21B, the trailing edge of the preceding sheet SH1 and the leading edge of the succeeding sheet SH2 are separated on the two sides of the conveyor roller 7*a*.

Even when performing control as described above, the overlap state of the preceding sheet SH1 and the succeeding sheet SH2 can be canceled.

Third Embodiment

Rollers to be used in reduction control can also be the conveyor rollers 5*a* and 8*a*. In this case, however, the conveyor roller 8*a* is driven independently of the conveyor roller 7*a*, by using a dedicated motor that is not shared with the conveyor roller 7*a*. Assume that the conveyor rollers 6*a* and 7*a* are one-way rollers and capable of idling in the conveyance direction. Assume also that the position T shown in FIG. 18A matches the conveyor roller 8*a*. The length L of the separation region is the distance from the conveyor roller 5*a* to the conveyor roller 8*a*.

Figure 22A:
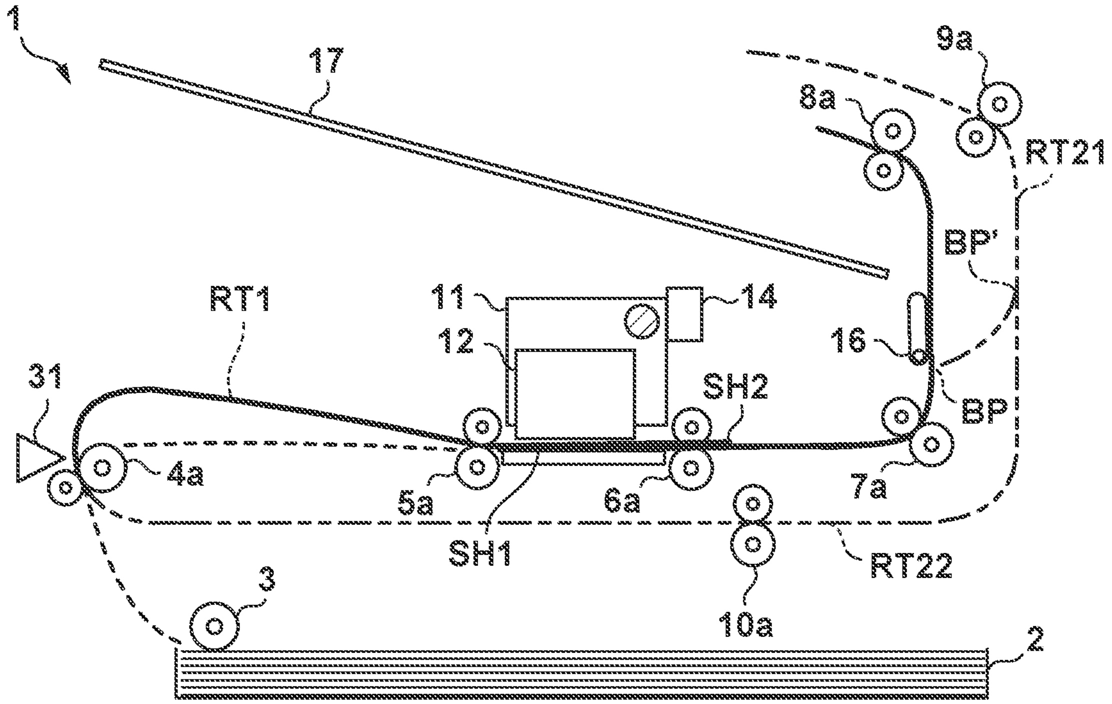
FIGS. 22A and 22B are views for explaining the operation of the printing apparatus, and show an example of still another reduction control.
Figure 22B:
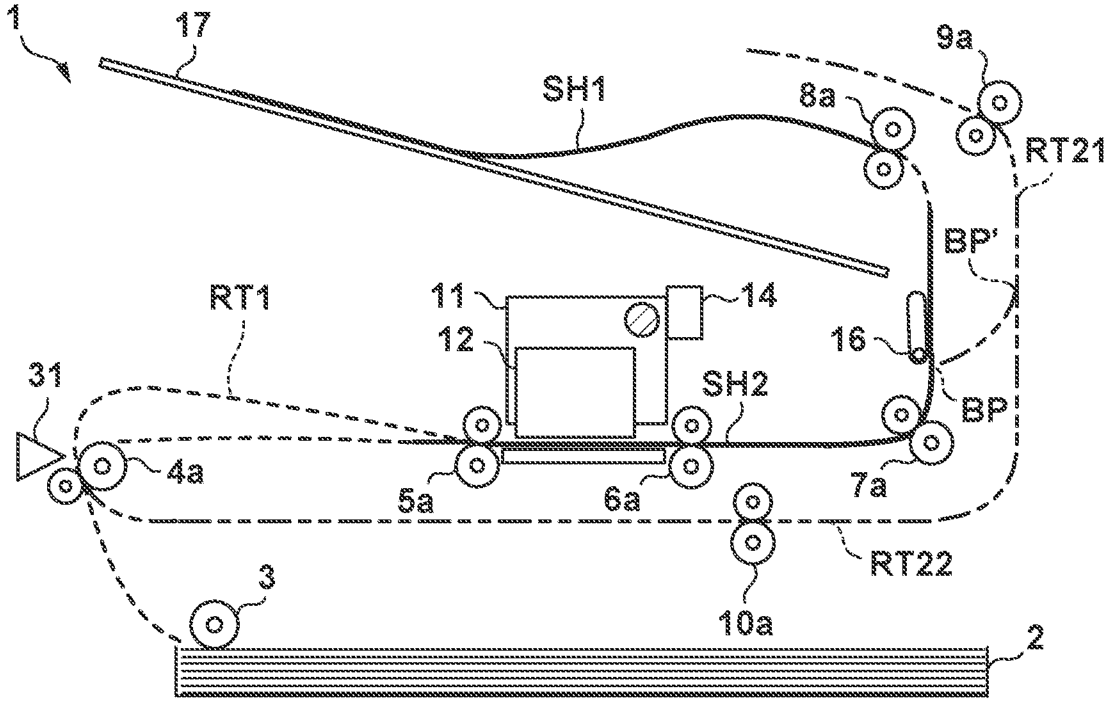

FIG. 22A shows an example of the start timing of reduction control in this embodiment. The trailing edge of the preceding sheet SH1 has passed the conveyor roller 5*a* but exists on the upstream side of the conveyor roller 6*a*. The conveyor roller 8*a* is rotated at the velocity V2 by the dedicated motor. Since the conveyor rollers 6*a* and 7*a* are one-way rollers, the preceding sheet SH1 can be conveyed without receiving any large load from these rollers. FIG. 22B shows the timing at which the reduction control is terminated. As shown in FIG. 22B, the trailing edge of the preceding sheet SH1 and the leading edge of the succeeding sheet SH2 are separated.

Even when performing control as described above, the overlap state of the preceding sheet SH1 and the succeeding sheet SH2 can be canceled.

Fourth Embodiment

Rollers to be used in reduction control can also be the conveyor rollers 5*a* and 9*a*, although this use is limited to the conveyance of the sheet SH1 in the sub-conveyance route RT2. Assume that the conveyor rollers 6*a* and 7*a* are one-way rollers and capable of idling in the conveyance direction. Assume also that the position T shown in FIG. 18A matches the branch point BP. The length L of the separation region is the distance from the conveyor roller 5*a* to the branch point BP.

Figure 23A:
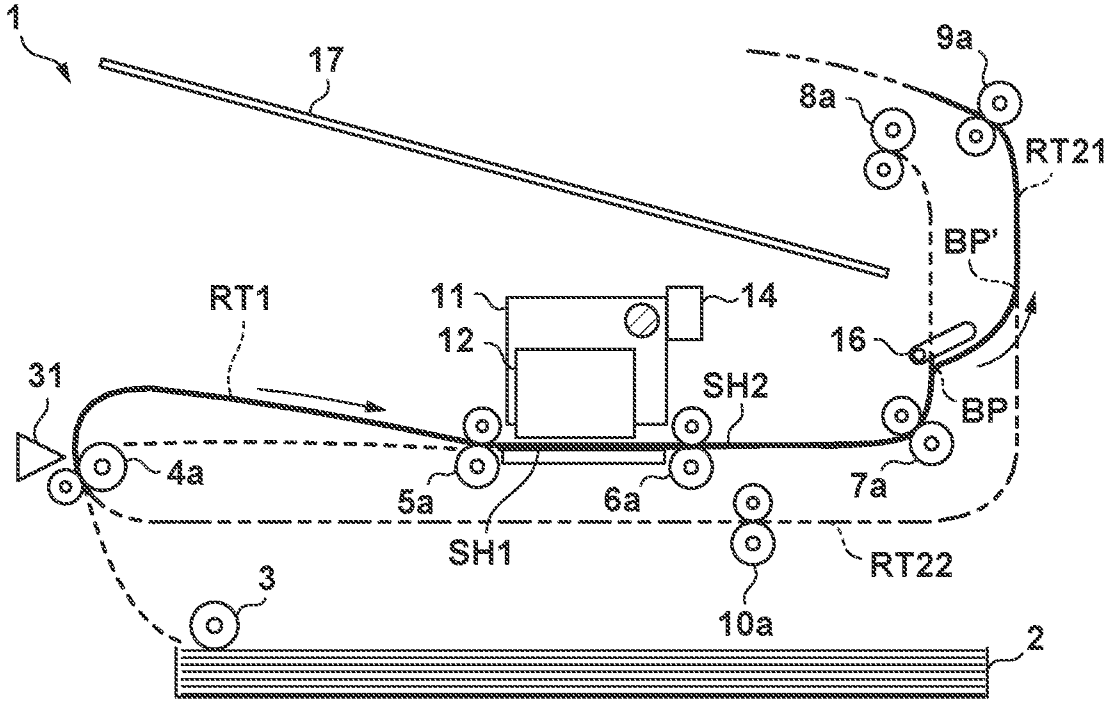
FIGS. 23A and 23B are views for explaining the operation of the printing apparatus, and show an example of still another reduction control.
Figure 23B:
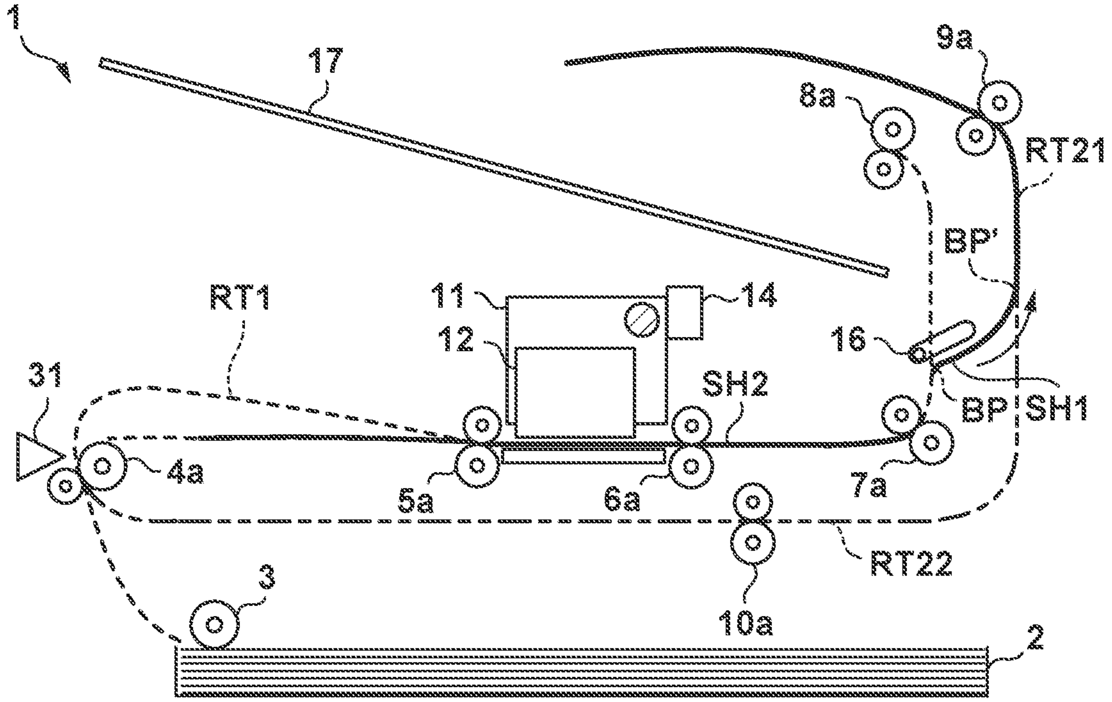

FIG. 23A shows an example of the start timing of reduction control in this embodiment. The trailing edge of the preceding sheet SH1 has passed the conveyor roller 5*a* but exists on the upstream side of the conveyor roller 6*a*. The conveyor roller 9*a* is rotated at the velocity V2. Since the conveyor rollers 6*a* and 7*a* are one-way rollers, the preceding sheet SH1 can be conveyed without receiving any large load from these rollers. FIG. 23B shows the timing at which the reduction control is terminated. As shown in FIG. 23B, the trailing edge of the preceding sheet SH1 and the leading edge of the succeeding sheet SH2 are separated.

Even when performing control as described above, the overlap state of the preceding sheet SH1 and the succeeding sheet SH2 can be canceled.

Fifth Embodiment

Before performing the skew correction explained in step S9 of FIG. 15, an overlap amount adjusting operation of adjusting the overlap amount so as to reduce it can also be performed. In this case, the velocity V2 during reduction control can be set at a lower velocity. In this overlap amount adjusting operation, for example, skew correction of the succeeding sheet SH is not performed when printing the last line of the preceding sheet SH, but is performed after the last line is printed and the preceding sheet SH is conveyed by a predetermined amount. This can reduce the overlap amount.

OTHER EMBODIMENTS

In reduction control, the velocity of a conveyor roller for conveying the succeeding sheet SH can be controlled to be lower than a normal velocity.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-042781, filed Mar. 17, 2022 which is hereby incorporated by reference herein in its entirety.

What is claimed is:

1. A printing apparatus comprising:
- a printhead configured to eject ink on a print medium;
- a first conveyance unit configured to convey a print medium in a conveyance direction;
- a second conveyance unit configured to convey a print medium printed by the printhead, on a downstream side in the conveyance direction of the first conveyance unit;
- a carriage configured to mount the printhead and move in a direction crossing the conveyance direction; and
- a control unit configured to perform reduction control of reducing an overlap amount of a preceding print medium and a succeeding print medium, from an overlap state in which the succeeding print medium overlaps a trailing edge of the preceding print medium,
- wherein the control unit executes printing control that alternately performs an operation of conveying the print medium by the first conveyance unit and a printing operation of ejecting ink on the print medium by the printhead while moving the carriage in a state in which the first conveyance unit stops conveying the print medium, and
- wherein the reduction control includes control of conveying the preceding print medium conveyed by the second conveyance unit faster than the succeeding print medium conveyed by the first conveyance unit, in a state in which the printing control for the succeeding print medium is executed.

2. The apparatus according to claim 1, wherein in the reduction control, the preceding print medium is conveyed faster than the succeeding print medium by continuously conveying the preceding print medium by the second conveyance unit, in a case where the first conveyance unit is intermittently conveying the succeeding print medium.

3. The apparatus according to claim 2, wherein
- the first conveyance unit is arranged on a downstream side of the printhead in the conveyance direction, and
- the control unit executes the reduction control in a state in which the preceding print medium has passed the first conveyance unit and the succeeding print medium has not passed the first conveyance unit.

4. The apparatus according to claim 2, wherein the control unit terminates the reduction control before the trailing edge of the preceding print medium arrives at the second conveyance unit after the reduction control is started.

5. The apparatus according to claim 2, wherein in the reduction control, the conveyance velocity of the second conveyance unit is set based on the overlap amount of the preceding print medium and the succeeding print medium in the overlap state.

6. The apparatus according to claim 2, further comprising:
- a third conveyance unit configured to convey the print medium to the first conveyance unit on an upstream side of the printhead in the conveyance direction; and
- a feed unit configured to convey a print medium to the third conveyance unit.

7. The apparatus according to claim 6, wherein
- a conveyance route of the print medium includes:
- a first route; and
- a second route branched at a branch point from the first route,
- the printhead is arranged midway along the first route, and on an upstream side of the branch point in the conveyance direction,
- the second route is a route for conveying the preceding print medium to the feed unit by inverting an obverse surface and a reverse surface, and
- the second conveyance unit is arranged in the second route.

8. The apparatus according to claim 7, wherein a flapper for switching routes to conveyance destinations of the preceding print medium is formed at the branch point.

9. The apparatus according to claim 1, wherein
- the control unit can execute formation control of forming the overlap state in which a leading edge of the succeeding print medium overlaps the preceding print medium before the succeeding print medium arrives at the printhead, and
- an overlap amount of the preceding print medium and the succeeding print medium in the formation control is smaller than a conveyance distance between the first conveyance unit and the second conveyance unit.

10. The apparatus according to claim 1, wherein in the reduction control, the overlap amount of the preceding print medium and the succeeding print medium is reduced to 0.

11. The apparatus according to claim 1, wherein a conveyance route of the print medium includes:

a first route; and a second route branched at a branch point from the first route, the printhead is arranged midway along the first route, and on an upstream side of the branch point in the conveyance direction, and the reduction control is executed before the succeeding print medium arrives at the branch point.

12. The apparatus according to claim 11, wherein a flapper for switching routes to conveyance destinations of the preceding print medium is formed at the branch point.

13. The apparatus according to claim 1, wherein the first conveyance unit is arranged on a downstream side of the printhead in the conveyance direction, and the control unit executes the reduction control in a state in which the preceding print medium has passed the first conveyance unit and the succeeding print medium has not passed the first conveyance unit.

14. The apparatus according to claim 1, wherein the first conveyance unit is arranged on an upstream side of the printhead in the conveyance direction, and the control unit executes the reduction control in a state in which the preceding print medium has passed the first conveyance unit and the succeeding print medium has not passed the first conveyance unit.

15. The apparatus according to claim 1, wherein the control unit terminates the reduction control before the trailing edge of the preceding print medium arrives at the second conveyance unit after the reduction control is started.

16. The apparatus according to claim 1, wherein a conveyance route of the print medium includes:

a first route; and a second route branched at a branch point from the first route, the printhead is arranged midway along the first route, and on an upstream side of the branch point in the conveyance direction, and the control unit terminates the reduction control before the trailing edge of the preceding print medium arrives at the branch point after the reduction control is started.

17. The apparatus according to claim 1, wherein the control unit terminates the reduction control before the succeeding print medium arrives at the second conveyance unit after the reduction control is started.

18. The apparatus according to claim 1, wherein the second conveyance unit is a discharge unit configured to convey the preceding print medium to a discharge tray.

19. The apparatus according to claim 1, wherein in the reduction control, the conveyance velocity of the second conveyance unit is set based on the overlap amount of the preceding print medium and the succeeding print medium in the overlap state.

20. A control method of a printing apparatus including printhead configured to eject ink on a print medium; a first conveyance unit configured to convey a print medium in a conveyance direction; a second conveyance unit configured to convey a print medium printed by the printhead, on a downstream side in the conveyance direction of the first conveyance unit; and a carriage configured to mount the printhead and move in a direction crossing the conveyance direction, the method comprising a reduction control step of reducing an overlap amount of a preceding print medium and a succeeding print medium, from an overlap state in which the succeeding print medium overlaps a trailing edge of the preceding print medium, and a printing control step of alternately performing a conveying operation of conveying the print medium by the first conveyance unit and a printing operation of ejecting ink on the print medium by the printhead while moving the carriage in a state in which the first conveyance unit stops conveying the print medium, wherein the reduction control step includes control of conveying the preceding print medium conveyed by the second conveyance unit faster than the succeeding print medium conveyed by the first conveyance unit, in a state in which the printing control for the succeeding print medium is executed.

* * * * *